United States Patent
Ramakrishnan et al.

(10) Patent No.: US 9,905,255 B1
(45) Date of Patent: Feb. 27, 2018

(54) BOND PAD SHARING FOR POWERING MULTIPLE HEATERS OF A MAGNETIC RECORDING HEAD

(71) Applicant: Seagate Technology LLC, Cupertino, CA (US)

(72) Inventors: Narayanan Ramakrishnan, Eden Praiie, MN (US); Declan Macken, Eden Prarie, MN (US); Jason Bryce Gadbois, Shakopee, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/415,165

(22) Filed: Jan. 25, 2017

Related U.S. Application Data

(60) Provisional application No. 62/289,431, filed on Feb. 1, 2016.

(51) Int. Cl.
| | | |
|---|---|---|
| G11B 5/48 | (2006.01) | |
| G11B 5/31 | (2006.01) | |
| G11B 5/60 | (2006.01) | |
| G11B 5/39 | (2006.01) | |
| G11B 5/00 | (2006.01) | |

(52) U.S. Cl.
CPC ............ *G11B 5/4853* (2013.01); *G11B 5/314* (2013.01); *G11B 5/3133* (2013.01); *G11B 5/397* (2013.01); *G11B 5/607* (2013.01); *G11B 5/6076* (2013.01); *G11B 2005/0021* (2013.01)

(58) Field of Classification Search
None
See application file for complete search history.

(56) References Cited

U.S. PATENT DOCUMENTS

| | | |
|---|---|---|
| 4,914,398 A | 4/1990 | Jove et al. |
| 5,298,641 A | 3/1994 | Stewen |
| 5,494,473 A | 2/1996 | Dupuis et al. |
| 5,527,110 A | 6/1996 | Abraham et al. |
| 5,610,783 A | 3/1997 | Maffitt et al. |
| 5,712,747 A | 1/1998 | Voldman et al. |
| 5,748,412 A | 5/1998 | Murdock et al. |
| 5,768,068 A | 6/1998 | Eckberg et al. |
| 5,850,374 A | 12/1998 | Abraham et al. |
| 5,896,249 A | 4/1999 | Fontana, Jr. et al. |
| 6,034,849 A | 3/2000 | Takizawa |
| 6,052,249 A | 4/2000 | Abraham et al. |
| 6,347,983 B1 | 2/2002 | Hao et al. |

(Continued)

OTHER PUBLICATIONS

U.S. Appl. No. 15/196,549, filed Jun. 29, 2016, Macken et al.
U.S. Appl. No. 15/414,234, filed Jan. 24, 2017, Ramakrishnan et al.

*Primary Examiner* — Craig A. Renner
(74) *Attorney, Agent, or Firm* — Hollingsworth Davis, LLC

(57) ABSTRACT

A slider of a magnetic recording head comprises a ground pad and a plurality of electrical bond pads coupled to bias sources. A component of the slider is coupled between first and second bond pads. A first heater of the slider is coupled between the first bond pad and the ground pad. A second heater of the slider is coupled between the second bond pad and the ground pad. A first diode is disposed on the slider and coupled in series with the first heater. A second diode is disposed on the slider and coupled in series with the second heater.

23 Claims, 14 Drawing Sheets

(56) References Cited

U.S. PATENT DOCUMENTS

| | | |
|---|---|---|
| 6,396,667 B1 | 5/2002 | Zhang et al. |
| 6,623,330 B2 | 9/2003 | Fukuroi |
| 6,813,118 B2 | 11/2004 | Pust et al. |
| 7,088,543 B2 | 8/2006 | Satoh et al. |
| 7,119,990 B2 | 10/2006 | Bajorek et al. |
| 7,133,254 B2 | 11/2006 | Hamann et al. |
| 7,362,534 B1 | 4/2008 | Schreck et al. |
| 7,446,977 B2 | 11/2008 | Nikitin et al. |
| 7,466,516 B2 | 12/2008 | Lille |
| 7,551,406 B1 | 6/2009 | Thomas et al. |
| 7,589,936 B1 | 9/2009 | McFadyen et al. |
| 7,643,250 B2 | 1/2010 | Araki et al. |
| 7,782,568 B2 | 8/2010 | Shiraki et al. |
| 7,936,538 B1 | 5/2011 | Zhang et al. |
| 7,969,687 B2 | 6/2011 | Lee et al. |
| 8,098,450 B2 | 1/2012 | Baumgart et al. |
| 8,159,780 B2 | 4/2012 | Brand |
| 8,169,751 B2 | 5/2012 | Albrecht et al. |
| 8,297,113 B2 | 10/2012 | Liners et al. |
| 8,310,779 B2 | 11/2012 | Hanchi et al. |
| 8,400,736 B2 | 3/2013 | Greminger et al. |
| 8,432,636 B2 | 4/2013 | Brand |
| 8,804,272 B1 | 8/2014 | Dakroub et al. |
| 8,879,189 B2 | 11/2014 | Miyamoto et al. |
| 8,937,791 B1 | 1/2015 | Olson et al. |
| 8,947,807 B2 | 2/2015 | Heim et al. |
| 8,953,275 B2 | 2/2015 | Chou et al. |
| 9,111,572 B2 | 8/2015 | Kunkel et al. |
| 9,607,640 B2 | 3/2017 | Macken et al. |
| 9,607,641 B1 * | 3/2017 | Ramakrishnan et al. .................... G11B 5/6005 |
| 2005/0024775 A1 | 2/2005 | Kurita et al. |
| 2005/0190495 A1 | 9/2005 | Lille |
| 2005/0213250 A1 * | 9/2005 | Kurita et al. ........ G11B 5/6005 360/234.4 |
| 2006/0056110 A1 | 3/2006 | Kato et al. |
| 2006/0203387 A1 | 9/2006 | White et al. |
| 2007/0035881 A1 | 5/2007 | Burbank et al. |
| 2007/0230056 A1 | 10/2007 | Beach et al. |
| 2007/0274005 A1 | 11/2007 | Zhu et al. |
| 2008/0074797 A1 * | 3/2008 | Ikai et al. ............ G11B 5/4853 360/294.4 |
| 2009/0040645 A1 | 2/2009 | Shimazawa et al. |
| 2009/0052076 A1 | 2/2009 | Shimazawa et al. |
| 2009/0052077 A1 | 2/2009 | Tanaka et al. |
| 2009/0195930 A1 | 8/2009 | Lille |
| 2009/0251821 A1 | 10/2009 | Song et al. |
| 2009/0262460 A1 | 10/2009 | Hanchi et al. |
| 2010/0226044 A1 | 9/2010 | Iwase |
| 2011/0013316 A1 * | 1/2011 | Brand ................. G11B 5/3133 360/110 |
| 2011/0019311 A1 | 1/2011 | Greminger et al. |
| 2011/0248167 A1 | 10/2011 | Gurvitch et al. |
| 2012/0113207 A1 | 5/2012 | Zheng |
| 2012/0120519 A1 | 5/2012 | Kunkel et al. |
| 2012/0120522 A1 | 5/2012 | Johnson et al. |
| 2012/0120527 A1 | 5/2012 | Kunkel et al. |
| 2012/0327529 A1 | 12/2012 | Hutchinson et al. |
| 2013/0188273 A1 | 7/2013 | Miyamoto et al. |
| 2013/0314817 A1 * | 11/2013 | Otsuki .................. G11B 5/486 360/86 |
| 2014/0160906 A1 * | 6/2014 | Yamada ............... G11B 5/4853 360/244.1 |
| 2014/0177083 A1 | 6/2014 | Heim et al. |
| 2014/0269838 A1 | 9/2014 | Macken |
| 2015/0103430 A1 * | 4/2015 | Gadbois et al. ...... G11B 5/4853 360/59 |
| 2015/0380021 A1 | 12/2015 | Kunkel et al. |
| 2017/0032810 A1 * | 2/2017 | Macken et al. ...... G11B 5/4853 |

* cited by examiner

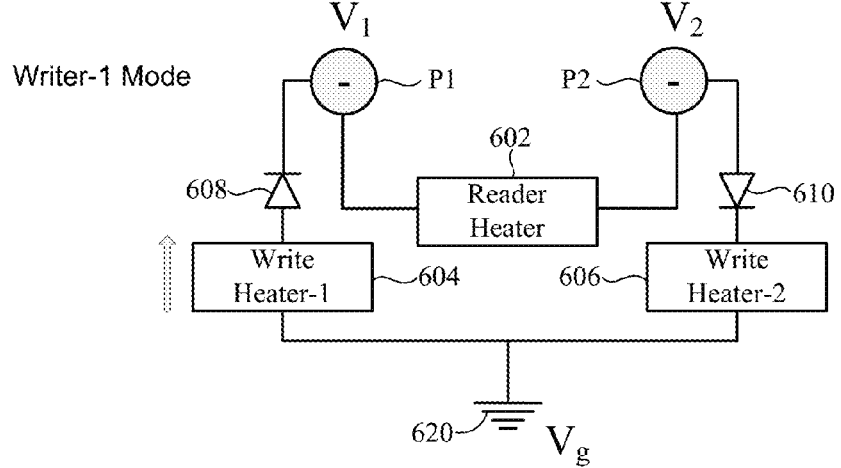
FIGURE 6A — Writer-1 Mode
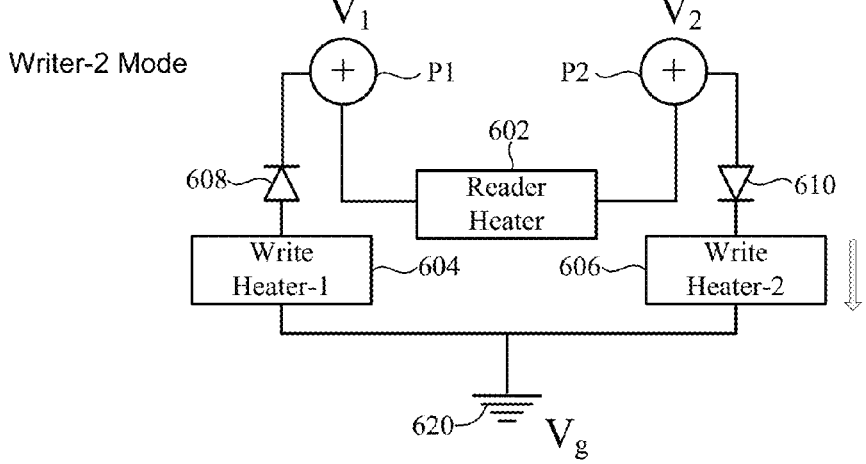
FIGURE 6B — Writer-2 Mode
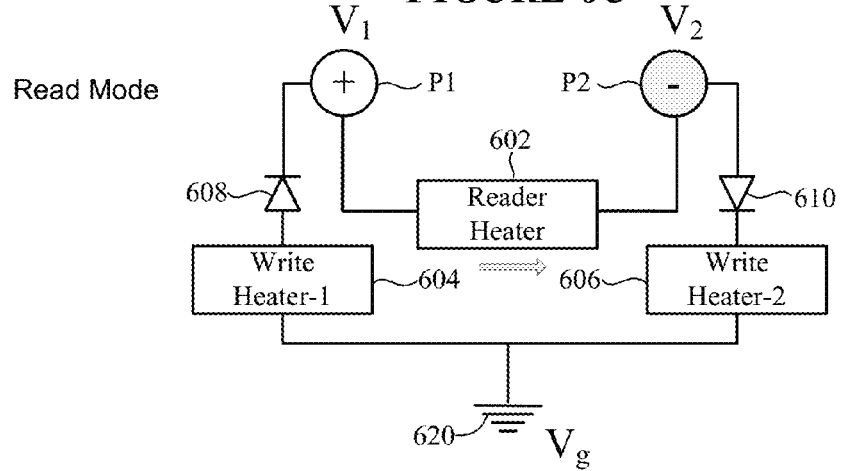
FIGURE 6C — Read Mode

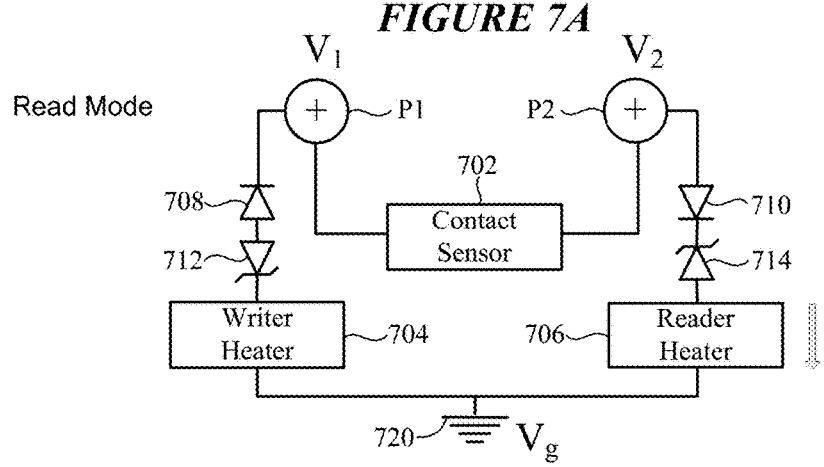
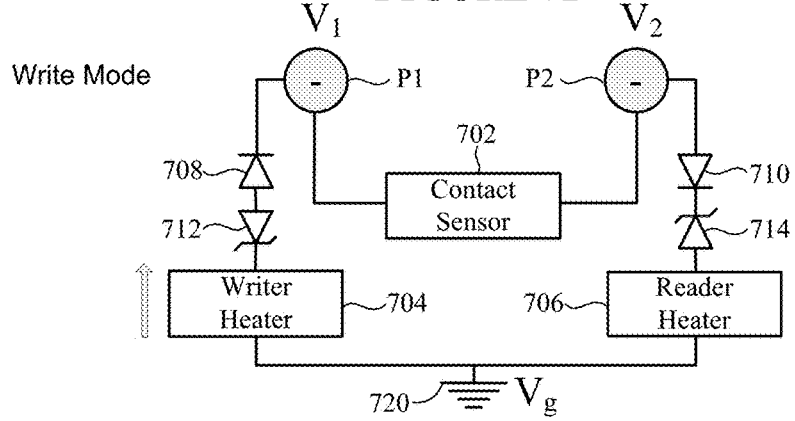
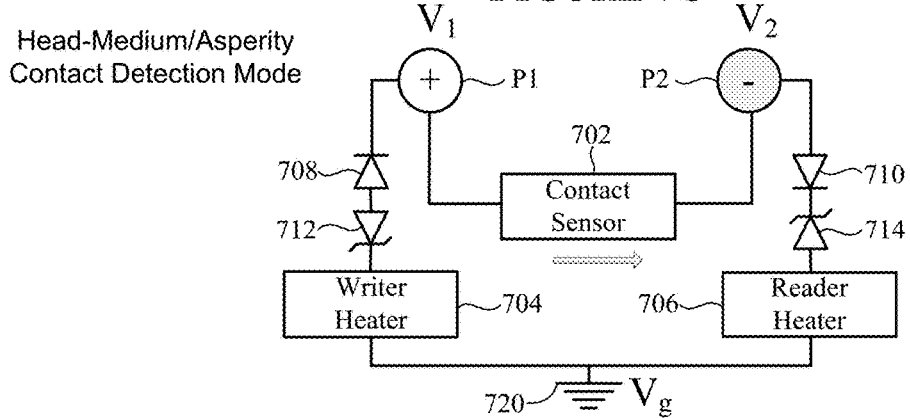

Head-Medium/Asperity Contact Detection Mode

Writer-1 Mode

Writer-2 Mode

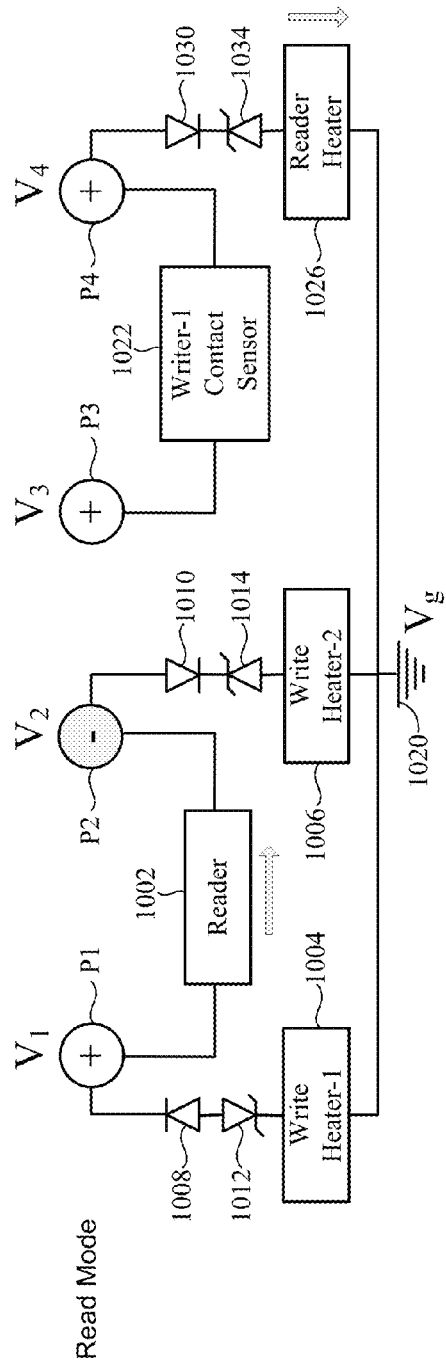
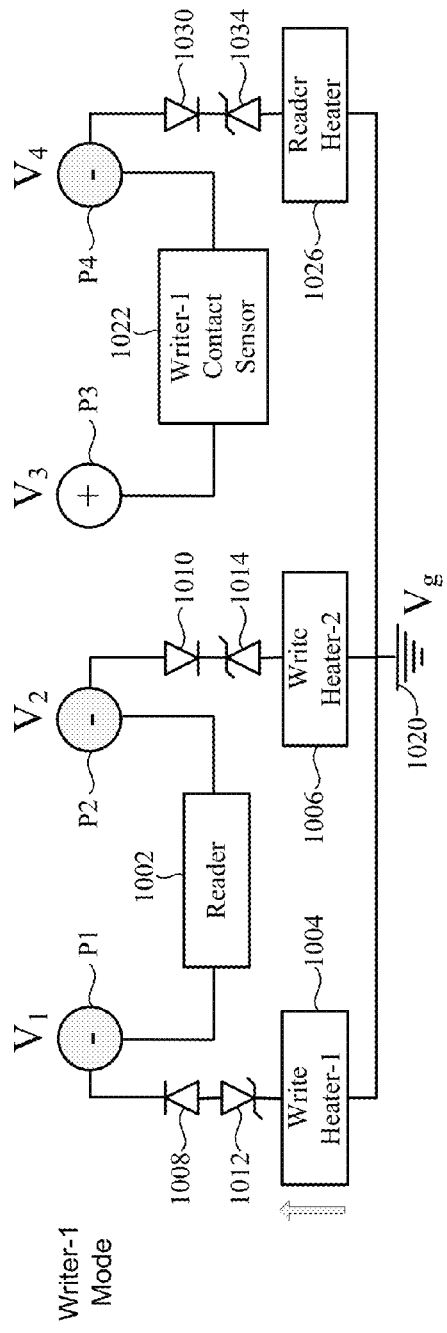

Read Mode

Write Mode

Read Mode

Write Mode

BOND PAD SHARING FOR POWERING MULTIPLE HEATERS OF A MAGNETIC RECORDING HEAD

RELATED PATENT DOCUMENTS

This application claims the benefit of Provisional Patent Application Ser. No. 62/289,431 filed on Feb. 1, 2016, to which priority is claimed pursuant to 35 U.S.C. § 119(e), and which is incorporated herein by reference in its entirety.

SUMMARY

Various embodiments are directed to an apparatus which includes a slider of a magnetic recording head comprising a ground pad and a plurality of electrical bond pads coupled to bias sources. A component of the slider is coupled between first and second bond pads. A first heater of the slider is coupled between the first bond pad and the ground pad. A second heater of the slider is coupled between the second bond pad and the ground pad. A first diode is disposed on the slider and coupled in series with the first heater. A second diode is disposed on the slider and coupled in series with the second heater.

Other embodiments are directed to an apparatus which includes a slider of a magnetic recording head comprising a ground pad, a plurality of electrical bond pads coupled to bias sources, a first writer having a wide write pole, and a second writer having a narrow write pole relative to that of the first writer. A component of the slider is coupled between first and second bond pads. A first heater of the slider is coupled between the first bond pad and the ground pad. The first heater is situated proximate the first writer and configured to thermally actuate the first writer. A second heater of the slider is coupled between the second bond pad and the ground pad. The second heater is situated proximate the second writer and configured to thermally actuate the second writer. A first diode is disposed on the slider and coupled in series with the first heater. A second diode is disposed on the slider and coupled in series with the second heater.

Further embodiments are directed to an apparatus which includes a slider of a magnetic recording head comprising a ground pad and a plurality of electrical bond pads coupled to bias sources. A first component of the slider is coupled between first and second bond pads. A first heater of the slider is coupled between the first bond pad and the ground pad. A second heater of the slider is coupled between the second bond pad and the ground pad. A first diode is disposed on the slider and coupled in series with the first heater. A second diode is disposed on the slider and coupled in series with the second heater. A second component of the slider is coupled between third and fourth bond pads. A third heater of the slider is coupled between the fourth bond pad and the ground pad. A third diode is disposed on the slider and coupled in series with the third heater.

The above summary is not intended to describe each disclosed embodiment or every implementation of the present disclosure. The figures and the detailed description below more particularly exemplify illustrative embodiments.

BRIEF DESCRIPTION OF THE DRAWINGS

FIGS. 6A, 6B, and 6C illustrate circuits that support bond pad sharing between a multiplicity of heaters of a slider in accordance with various embodiments;

FIGS. 7A, 7B, and 7C illustrate circuits that support bond pad sharing between a multiplicity of heaters and at least one component of a slider in accordance with various embodiments;

FIGS. 10A and 10B illustrate circuitry that supports bond pad sharing between a multiplicity of heaters and a multiplicity of components a slider in accordance with various embodiments;

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Data storage systems commonly include one or more transducers that write and read information to and from a magnetic storage medium. A recording transducer, for example, incorporates several distinct electrical and, in some implementations, optical components that require specified voltages/currents to operate properly. Representative examples of such electrical transducer components include one or more readers, one or more reader heaters, one or more writers, and one or more writer heaters, among other possible components. Some recording transducers incorporate one or more sensors, such as contact sensors, each requiring specified operating voltages/currents. Each of the electrically activated components of a transducer is electrically coupled to corresponding electrical contacts or bond pads of the transducer. Depending on the particular design of a given transducer, various bond pads can be configured as voltage sources, current sources, and ground contacts, and can also send and receive signals (e.g., write signals, readback signals, sensor signals, control signals). Because bond pads take up appreciable space on a transducer and adding bond pads can be very expensive due to changes in design and fabrication processes needed to accommodate such additional bond pads, it is desirable to minimize both the number of bond pads and changes to the bond pad configuration of a transducer.

An issue with adding additional components or any electrical feature in general to an existing slider or HGA is the real estate required to place bond pads which allow access to these new features. Some slider form factors, for example, can accommodate nine bond pads. In other sliders, a total of ten bond pads is likely feasible. Any increase in bond pad count above nine or ten (depending on the slider/HGA design) likely requires migration to a top bond pad configuration, which is both more technically challenging and expensive. An alternative to adding an additional bond pad above the designed-in pad count is to share an existing bond pad between two or more electrical devices on the slider.

Sharing a common bond pad between two or more electrical components (e.g., readers) can raises the issue of bias contention as well as degraded performance (e.g., degraded common mode rejection). Such issues can be addressed by addition or modification of biasing and filtering circuitry, although this approach adds some degree of complexity to the design. An alternative and simpler approach involves pad sharing between electrical components having the same or similar biasing and/or filtering requirements. Another example of this approach involves a bond pad shared between electrical components that operate at different times or can be operated alternately.

Figure 1:
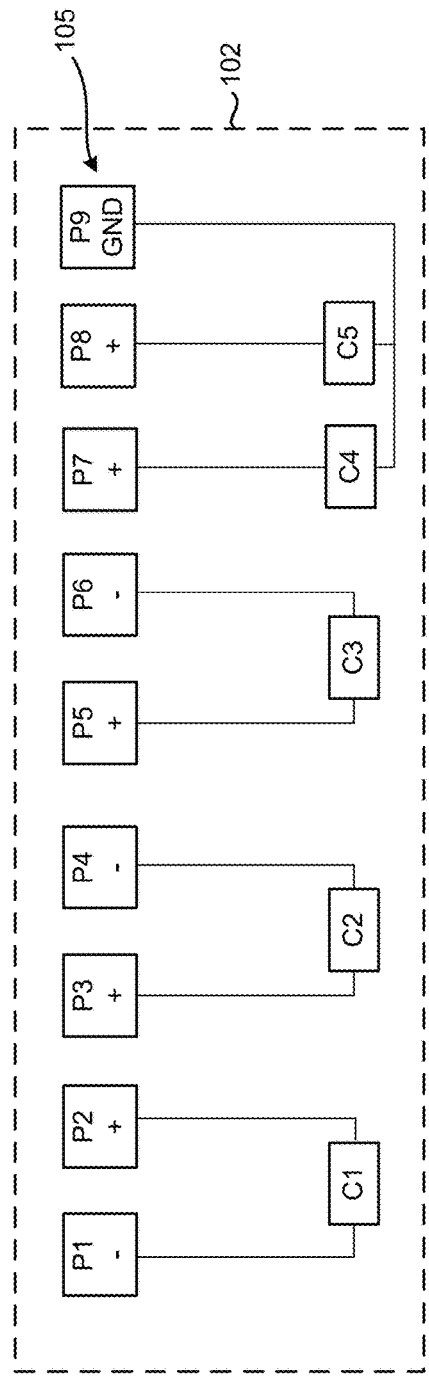
FIG. 1 illustrates an embodiment of a recording transducer that does not utilize pad sharing.
Figure 2:
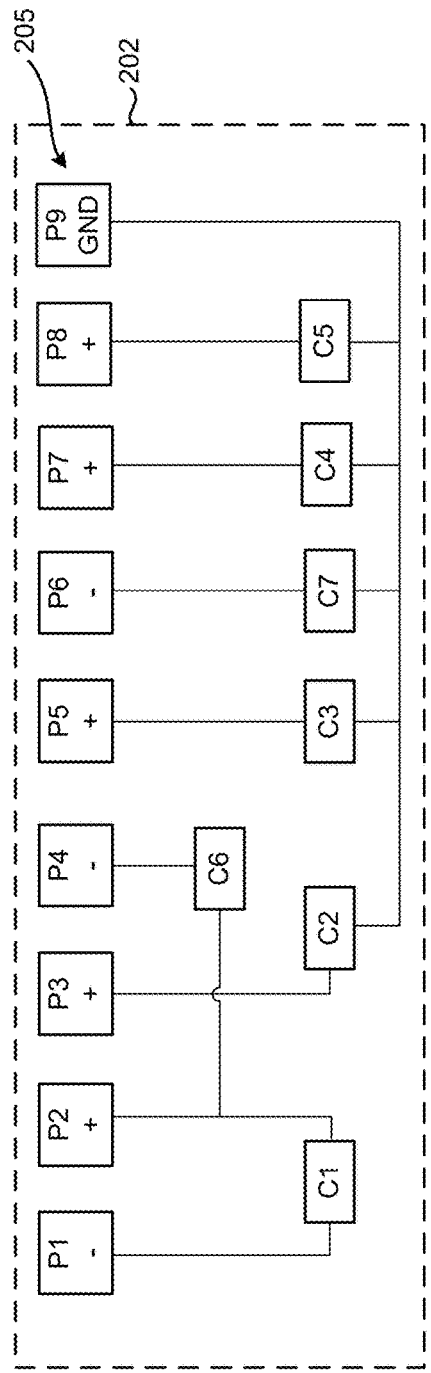
FIG. 2 illustrates a recording transducer that utilizes pad sharing according to embodiments of the present disclosure.

FIG. 1 illustrates an embodiment of a recording transducer that does not utilize pad sharing according to the present disclosure. FIG. 2 illustrates a recording transducer that utilizes pad sharing according to embodiments of the present disclosure. The bond pad layout shown in FIG. 1 is the same as that shown in FIG. 2, and the electrical components identified as C1-C5 in FIG. 1 are the same as those shown as components C1-C5 in FIG. 2 for purposes of illustration. It is understood that the bond pad layout, components, and wiring configuration shown in FIGS. 1 and 2 are provided for non-limiting illustrative purposes.

FIG. 1 illustrates a slider 102 that supports a recording transducer comprising a multiplicity of electrical components (C1-C5) coupled to a set 105 of bond pads (P1-P9). The set 105 of bond pads includes eight electrical bond pads (P1-P8) and one ground pad (P9, also referred to herein simply as ground). The term "electrical bond pad" refers to a bond pad that is coupled to a bias source, such as a voltage or current source (AC or DC), that provides power for an electrical component. The slider 102 shown in FIG. 1 utilizes eight electrical bond pads (P1-P8) to power five electrical components (C1-C5).

Electrical components C1-C3 can be referred to as dual-ended components, since each is coupled between a pair of electrical bond pads (e.g., one end of C1 is connected to negative pad P1 and the other end of C1 is connected to positive pad P2). Each dual-ended component requires two electrical bond pads for proper operation. Electrical components C4 and C5 can be referred to as single-ended components, since each is coupled between a single electrical bond pad and ground (e.g., one end of C5 is connected to positive pad P8 and the other end of C5 is connected to ground pad P9). Each single-ended component requires one electrical bond pad for proper operation. It is noted that the polarity of the electrical bond pads can change during operation, such that a given pad can be at a positive potential during one operating state and at a negative potential during another operating state.

FIG. 2 shows an apparatus according to various embodiments that includes a slider 202 comprising a plurality of electrical bond pads coupled to bias sources 205. The slider 202 further comprises a plurality of electrical components each coupled to at least one of the electrical bond pads. At least one of the electrical bond pads is shared between a plurality of the electrical components. According to some embodiments, the slider 202 supports a recording transducer comprising a multiplicity of electrical components (C1-C7) coupled to a set 205 of bond pads (P1-P9). As previously discussed, the set 205 of bond pads is the same as the bond pad set 105 shown in FIG. 1 (i.e., 8 electrical bond pads and 1 ground pad). In contrast to the slider 102 illustrated in FIG. 1 which supports five electrical components using eight electrical bond pads, the slider 202 shown in FIG. 2 supports seven electrical components while using the same number (i.e., 8) of electrical bond pads.

In FIG. 2, electrical bond pad P2 is shared between electrical components C1 and C6, thereby freeing up one electrical bond pad for other use or elimination. The electrical component C2 in FIG. 2, which performs the same function as C2 in FIG. 1, is implemented as a single-ended component, thereby freeing up one electrical bond pad for other use or elimination. By freeing up two electrical bond pads in the illustrative slider 202 shown in FIG. 2, two additional components (C6 and C7) have been added to the slider 202 as compared to the implementation illustrated in FIG. 1.

The need for sharing of electrical bond pads has intensified in the advent of recording heads configured for heat-assisted magnetic recording, also referred to as energy-assisted magnetic recording (EAMR), thermally-assisted magnetic recording (TAMR), and thermally-assisted recording (TAR). In addition to convention components, A HAMR head incorporates various optical components and sensors that require power supplied by the set of bond pads made available at the transducer. The increase in the number and type of components and sensors of a HAMR head significantly complicates the electrical bond pad connection and powering strategy for a particular HAMR head design.

Figure 3:
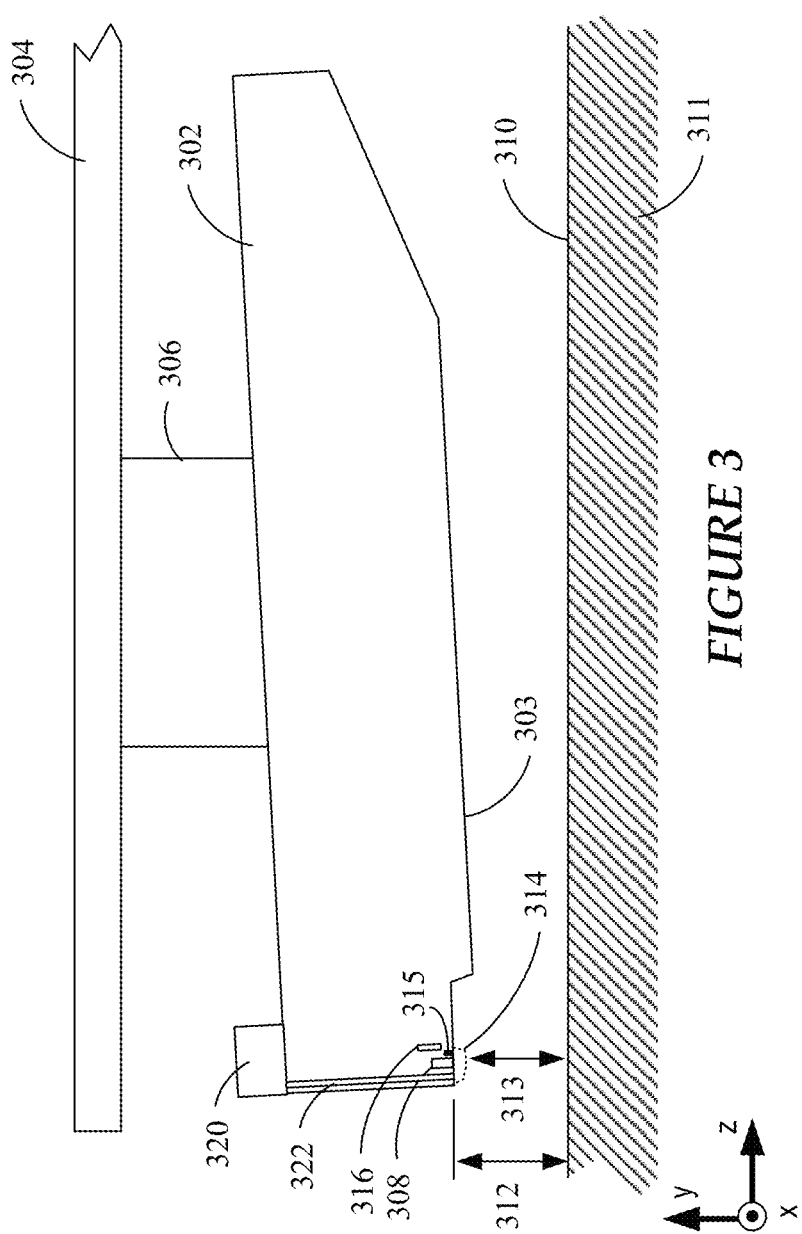
FIG. 3 shows a side view of a read/write transducer configured for heat-assisted magnetic recording (HAMR) according to a representative embodiment.

FIG. 3 shows a side view of a read/write transducer 302 configured for heat-assisted magnetic recording according to a representative embodiment. The read/write transducer 302 may be used in a magnetic data storage device, e.g., a hard disk drive. The read/write transducer 302 may also be referred to herein as a slider, read head, recording head, etc. The read/write transducer 302 is coupled to an arm 304 by way of a suspension 306 that allows some relative motion between the read/write transducer 302 and arm 304. The read/write transducer 302 includes read/write transducers 308 at a trailing edge that are held proximate to a surface 310 of a magnetic recording medium 311, e.g., magnetic disk. The read/write transducer 302 further includes a laser 320 and a waveguide 322. The waveguide 322 delivers light from the laser 320 to components (e.g., a near-field transducer) near the read/write transducers 308.

When the read/write transducer 302 is located over surface 310 of recording medium 311, a flying height 312 is maintained between the read/write transducer 302 and the surface 310 by a downward force of arm 304. This downward force is counterbalanced by an air cushion that exists between the surface 310 and an air bearing surface 303 (also referred to herein as a "media-facing surface") of the read/write transducer 302 when the recording medium 311 is rotating. It is desirable to maintain a predetermined slider flying height 312 over a range of disk rotational speeds during both reading and writing operations to ensure consistent performance. Region 314 is a "close point" of the read/write transducer 302, which is generally understood to be the closest spacing between the read/write transducers 308 and the magnetic recording medium 311, and generally defines the head-to-medium spacing 313.

To account for both static and dynamic variations that may affect slider flying height 312, the read/write transducer 302 may be configured such that a region 314 of the read/write transducer 302 can be configurably adjusted during operation in order to finely adjust the head-to-medium spacing 313. This is shown in FIG. 3 by a dotted line that represents a change in geometry of the region 314. In this example, the geometry change may be induced, in whole or in part, by an increase or decrease in temperature of the region 314 via a heater 316. A thermal sensor 315 is shown situated at or near the close point 314 (e.g., adjacent the read/write transducers 308, such as near the near-field transducer) or can be positioned at other location of the ABS 303.

Figure 4:
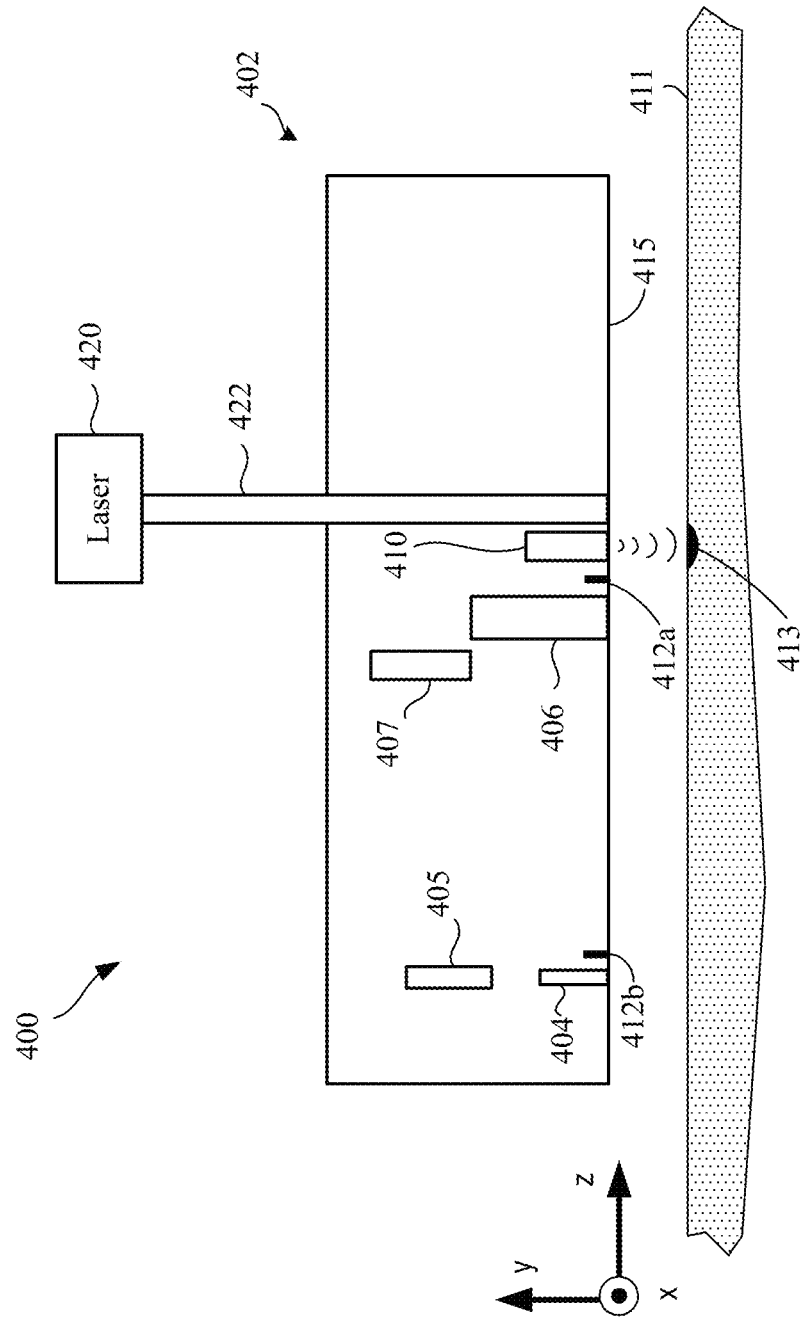
FIG. 4 shows a HAMR head arrangement in accordance with various embodiments.

FIG. 4 shows a HAMR head arrangement 400 in accordance with various embodiments. The recording head arrangement 400 includes a slider 402 positioned proximate a rotating magnetic medium 411. The slider 402 includes a reader 404 and a writer 406 proximate the ABS 415 for respectively reading and writing data from/to the magnetic medium 411. The writer 406 is located adjacent a near-field transducer (NFT) 410 which is optically coupled to a light source 420 (e.g., laser diode) via a waveguide 422. The light source 420 can be mounted external, or integral, to the slider 402. The light source 420 energizes the NFT 410 via the waveguide 422. The writer 406 includes a corresponding heater 407, and the reader 404 includes a corresponding heater 405 according to various embodiments. The writer heater 407 can be powered to cause protrusion of the ABS 415 predominately in the ABS region at or proximate the writer 406, and the reader heater 405 can be powered to cause protrusion of the ABS 415 predominately in the ABS region at or proximate the reader 404. Power can be controllably delivered independently to the heaters 407 and 405 to adjust the fly height (e.g., clearance) of the slider 402 relative to the surface of the recording medium 411. One or more thermal sensors 412a, 412b can be situated at various locations on the slider 402 at or near the ABS 415 for purposes of monitoring temperature, head-medium spacing changes, and head-medium contact.

A HAMR device utilizes the types of optical devices described above to heat a magnetic recording media (e.g., hard disk) in order to overcome superparamagnetic effects that limit the areal data density of typical magnetic media. When writing with a HAMR device, the electromagnetic energy (e.g., laser or light) is concentrated onto a small hot spot 413 over the track of the magnetic medium 411 where writing takes place, as shown in FIG. 4. The light from the source 420 propagates to the NFT 410, e.g., either directly from the source 420 or through the mode converter or by way of a focusing element. Other optical elements, such as couplers, mirrors, prisms, etc., may also be formed integral to the slider.

As a result of what is known as the diffraction limit, optical components cannot be used to focus light to a dimension that is less than about half the wavelength of the light. The lasers used in some HAMR designs produce light with wavelengths on the order of 700-1550 nm, yet the desired hot spot 413 is on the order of 50 nm or less. Thus, the desired hot spot size is well below half the wavelength of the light. Optical focusers cannot be used to obtain the desired hot spot size, being diffraction limited at this scale. As a result, the NFT 410 is employed to create a hot spot on the media.

The NFT 410 is a near-field optics device configured to generate local surface plasmon resonance at a designated (e.g., design) wavelength. The NFT 410 is generally formed from a thin film of plasmonic material (e.g., gold, silver, copper) on a substrate. In a HAMR slider 402, the NFT 410 is positioned proximate the write pole of the writer 406. The NFT 410 is aligned with the plane of the ABS 415 parallel to the read/write surface of the magnetic medium 411. The NFT 410 achieves surface plasmon resonance in response to the incident electromagnetic energy. The plasmons generated by this resonance are emitted from the NFT 410 towards the magnetic medium 411 where they are absorbed to create the hot spot 413. At resonance, a high electric field surrounds the NFT 410 due to the collective oscillations of electrons at the metal surface (e.g., substrate) of the magnetic medium 411. At least a portion of the electric field surrounding the NFT 410 gets absorbed by the magnetic medium 411, thereby raising the temperature of the spot 413 on the medium 411 as data is being recorded.

Sharing of electrical bond pads is important for magnetic recording heads configured for interlaced magnetic recording, also referred to as interleaved magnetic recording. Recording heads configured for IMR include two writers in addition to one or more readers. One of the writers is wide and the other writer is narrow. Each of the two writers has an associated writer heater. The addition of a second writer and a second heater for thermally actuating the second writer increases the demand for additional bond pads. Embodiments are directed to bond pad sharing for recording heads configured for IMR. Some embodiments are directed to bond pad sharing for recording heads configured for both IMR and HAMR.

Figure 5:
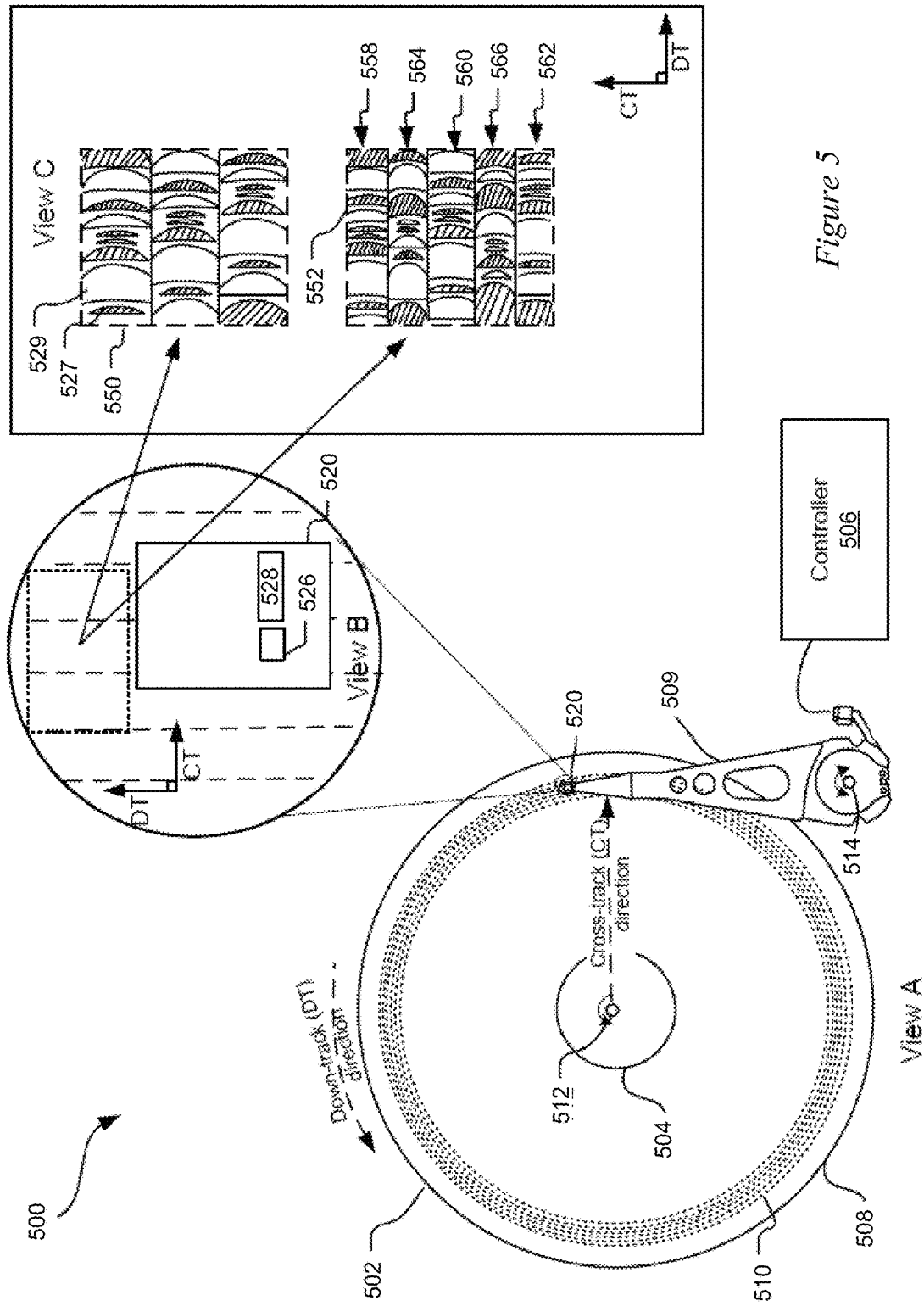
FIG. 5 shows a recording transducer and magnetic recording medium configured to implement interlaced magnetic recording (IMR) in accordance with various embodiments.

FIG. 5 illustrates a data storage device 500 including a recording head 520 for writing data on a magnetic storage medium 508 in accordance with an interlaced magnetic recording methodology. As illustrated in View A of FIG. 5, the storage medium 508 rotates about a spindle center or a disk axis of rotation 512 during rotation, and includes an inner diameter 504 and an outer diameter 502 between which are a number of concentric data tracks 510. Information may be written to and read from data bit locations in the data tracks on the storage medium 508. The recording head 520 is mounted on an actuator assembly 509 at an end distal to an actuator axis of rotation 514. The recording head 520 flies in close proximity above the surface of the storage medium 508 during disk rotation. A seek operation positions the recording head 520 over a target data track for read and write operations.

Referring to View B of FIG. 5, the recording head 520 includes two different writers 526 and 528, also referred to as write elements. The writers 526 and 528 are shown to be in alignment in the cross-track direction; however, other write element configurations are contemplated for use in other implementations. Each of the writers 526 and 528 includes a write pole (not shown) that converts a series of electrical pulses sent from a controller 506 into a series of magnetic pulses of commensurate magnitude and length, and the magnetic pulses selectively magnetize magnetic grains of the rotating magnetic media 508 as they pass below the write element 526 or 528.

View C of FIG. 5 illustrates magnified views 550 and 552 of a same surface portion of the storage media 508 according to different write methodologies and settings of the storage device 500. Specifically, the magnified views 550 and 552 include a number of magnetically polarized regions, also referred to herein as "data bits," along the data tracks of the storage media 508. Each of the data bits (e.g., a data bit 527) represents one or more individual data bits of a same state (e.g., 1s or 0s). For example, the data bit 529 is a magnetically polarized region representing multiple bits of a first state (e.g., "000"), while the adjacent data bit 527 is an oppositely polarized region representing one or more bits of a second state (e.g., a single "1"). The data bits in each of the magnified views 550, 552 are not necessarily illustrative of the actual shapes or separations of the bits within an individual system configuration.

The magnified view 550 in View C of FIG. 5 illustrates magnetic transitions recorded according to a conventional magnetic recording (CMR) technique. In a CMR system, all written data tracks are randomly writeable and of substantially equal width. A random write refers to a write operation to a first data track that does not critically impair (e.g., corrupt or erase) data on either adjacent track. According to one implementation, the recorded data bits of the magnified view 550 are recorded with a same write element (e.g., either the write element 526 or 528) of the recording head 520.

In a CMR system, an achievable linear density (e.g., density along an individual data track) is limited by the size of the write element used to write the data encoded on the storage medium 508. For example, the data bit 527 may represent the smallest data bit recordable by a particular write element. Likewise, a read element (not shown) may have difficulty deciphering the data recorded on the media 508 if the various polarized regions are too small or placed too close to one another.

The magnified view 552 illustrates data bits recorded according to another set of system parameters implementing an interlaced magnetic recording (IMR) technique. According to one implementation, this IMR technique provides for a higher total areal density capability (ADC) with a lower observable BER than conventional recording systems.

Specifically, the magnified view 552 illustrates alternating data tracks of different track widths and different linear densities. The write element 528 is used to write a first grouping of alternating data tracks (e.g., data tracks 558, 560, and 562) with a wide written track width, while the write element 526 is used to write a second grouping of interlaced data tracks (e.g., the data tracks 564, 566) with a narrower written track width. Data of the narrow, interlaced data tracks overwrites edges of adjacent and previously written data tracks of the wider width.

For example, writing of the data track 564 overwrites data on the adjacent edges of the data tracks 564 and 566. In other words, a defined track pitch (e.g., radial spacing between centers of two directly adjacent data tracks) is by design less than the write width of the wide write element 528 but greater than or approximately equal to the write width of the narrow write element 526.

In another implementation, the first grouping of data tracks (e.g., the data tracks 558, 560, and 562) includes data of a higher linear density than the interlaced tracks (e.g., the data tracks 564 and 566). Other implementations of the disclosed technology may provide for data tracks of three or more different written track widths and/or three or more different linear densities on a same surface of the magnetic storage medium 508.

To generate the IMR pattern shown in magnified view 552, a storage controller 506 of the storage device 500 alters one or more system parameters (e.g., write current, overshoot, waveform, etc.) based on a discrete write location where data is received and stored on the storage medium 508. For example, the storage controller 506 may write even-numbered data tracks on the storage medium 508 with a first linear density and track width and write odd-numbered data tracks on the magnetic media with a second linear density and different track width.

In one implementation, the storage medium 508 is divided radially into zones and each zone is associated with multiple linear densities. For example, two different linear densities may be used to write data of alternating tracks within each individual radial zone. The linear densities used in one radial zone may differ from the linear densities used in any other radial zone of the storage medium 508.

Further, the controller 506 may be configured to systematically direct incoming write commands to different data tracks of the storage medium according to a number of prioritized random access (PRA) rules. For example, the controller 506 selects storage locations for each incoming write command to systematically maximize a total number of possible random writes.

In general, PRA rules dictate an order in which two or more data tracks on the magnetic storage medium 508 are to be written. For example, a PRA rule may specify that a particular data track (center data track) is to be written before either of the data tracks adjacent to the particular data track. In this case, the particular data track is randomly writable if the adjacent data tracks do not contain any data. If however, data is already stored on either of the adjacent data tracks, the data write to the particular data track may include: (1) caching the data on one or both of the adjacent data tracks; (2) writing the particular track; and (3) subsequently, re-writing the data of one or both of the adjacent data tracks. Embodiments that use IMR when writing data can be implemented according to the embodiments disclosed in commonly-owned, co-pending U.S. patent application Ser. No. 14/686,456, filed on Apr. 14, 2015, which claims benefit of priority to U.S. Provisional Application No. 62/083,696, filed on Nov. 24, 2014, and also to commonly-owned, co-pending U.S. patent application Ser. No. 14/686,561, filed on Apr. 14, 2015, which claims benefit of priority to U.S. Provisional Patent Application No. 62/083,732, filed on Nov. 24, 2014, all of which are hereby incorporated herein by reference.

Various embodiments of bond pad sharing by a multiplicity of heaters and other electrical components of a slider will now be described in greater detail. Some embodiments are directed to slider configurations that facilitate bond pad sharing between multiple heaters and at least one other electrical component of a slider, such that one, two, or three bond pads are freed up for other uses (or are not needed). Other embodiments are directed to slider configurations that facilitate bond pad sharing between multiple heaters associated with multiple writers configured for IMR and at least one other electrical component of a slider, such that one, two, or three bond pads are freed up for other uses (or are not needed). According to various embodiments, diodes are incorporated into bond pad sharing circuitry to control current flow through a multiplicity of heaters based on mode of operation (e.g., read mode, write mode, contact/asperity detection mode). According to further embodiments, standard diodes and Zener diodes are incorporated into bond pad sharing circuitry to control current flow through a multiplicity of heaters based on mode of operation. Addition of Zener diodes provides for enhanced ground noise immunity, and thereby helps to maintain the desired control and directionality of signal flow across the devices (i.e. prevent flipping of a desired OFF state to an ON state due to ground noise). Zener diodes can be optionally incorporated particularly for instances where the magnitude of fluctuation in ground potential (about its mean/nominal value) is larger than the sum of the magnitudes of the applied potential at the bond pad and the diode built-in (threshold) potential. The diodes can be formed using a silicon-on-slider fabrication methodology. Alternatively, in other embodiments, the diodes can be of the Schottky type that would be fabricated as part of the wafer process.

It is noted that, in general, normal diodes should be sufficient if the magnitude of fluctuation in ground potential is less than the sum of |V+| (or |V−|) and the diode's built-in potential (threshold potential). By choosing the magnitudes of V+ (and V−) appropriately in conjunction with a suitable choice of the diode (material combinations and doping levels), the desired directionality and control of signal flow between the devices in the disclosed bond pad sharing schemes can be achieved. The Zener diodes provide additional tolerance to ground potential fluctuation and would be an useful option to exercise if constrained by system architecture (e.g., pre-amp) and design considerations that limit the range of V+ (or V−) or constrained by engineering limitations (e.g., wafer process considerations) in the choice of diodes. According to various embodiments (e.g., those depicted in FIGS. 7, 8, 9 and 10), simple diodes can be the default, and inclusion of Zener diodes can be a fail-safe optional addition.

According to some embodiments, a slider of a magnetic recording head includes a ground pad and a plurality of electrical bond pads coupled to bias sources. A component of the slider, such as a reader, reader heater or a contact sensor, is coupled between first and second bond pads. A first heater of the slider is coupled between the first bond pad and the ground pad. A second heater of the slider is coupled between the second bond pad and the ground pad. A first diode is disposed on the slider and coupled in series with the first heater, such as between the first bond pad and the first heater. A second diode is disposed on the slider and coupled in series with the second heater, such as between the second bond pad and the second heater. In some embodiments, the first and second heaters are each writer heaters for thermally actuating first and second writers of the slider. The first and second writers can be configured for alternate activation to implement an IMR technique. In other embodiments, the first heater is a writer heater, the second heater is a reader heater, and the component is a contact sensor, such as a head-medium contact sensor or an asperity sensor.

FIGS. 6A-6C illustrate circuits that support bond pad sharing between a multiplicity of heaters of a slider in accordance with various embodiments. More particularly, FIGS. 6A-6C illustrate circuits that support bond pad sharing between two writer heaters and a reader heater of a slider in accordance with various embodiments. The circuits shown in FIGS. 6A-6C include a first write heater 604 and a second write heater 606. The first and second writer heaters 604 and 606 can be configured to implement an IMR methodology according to various embodiments. For example, the first writer heater 604 can be situated on the slider adjacent to a first writer having a wide write pole (e.g., see writer 528 shown in FIG. 5). The second writer heater 606 can be situated on the slider adjacent to a second writer having a narrow write pole relative to that of the first writer (e.g., see writer 526 shown in FIG. 5). The first and second writer heaters 604 and 606 can be controlled to (e.g., alternately) thermally actuate the first and second writer, respectively.

The circuits shown in FIGS. 6A-6C also include a reader heater 602 coupled between a first bond pad, P1, and a second bond pad, P2. The first writer heater 604 is coupled between the first bond pad, P1 and a ground pad 620. The second writer heater 606 is coupled between the second bond pad, P2 and the ground pad 620. The reader heater 602 and the first and second writer heaters 604 and 606 can be implemented as metal wires or other resistive elements formed during slider fabrication. A first diode 608 is coupled in series with the first writer heater 604, such as between bond pad P1 and the first writer heater 604. As shown, the cathode of the diode 608 is coupled to bond pad P1, and the anode of the diode 608 is coupled to the first writer heater 604. A second diode 610 is coupled in series with the second writer heater 606, such as between bond pad P2 and the second writer heater 606. As shown, the anode of the diode 610 is coupled to bond pad P2, and the cathode of the diode 610 is coupled to the second writer heater 606. The first and second diodes 608 and 610 (e.g., p-n diodes) can be formed during slider fabrication using a silicon-on-slider methodology. In some embodiments, the first and second diodes 608 and 610 can be implemented as Schottky diodes (e.g., SiC Schottky diodes).

In FIGS. 6A-6C, two bond pads, P1 and P2, are shown for illustrative purposes. Bond pads P1 and P2 can be individually biased in a number of ways, such as by providing a positive voltage, a negative voltage, or a potential equivalent to that of the ground pad at each bond pad, for example. As discussed previously, the reader heater 602 is coupled between bond pads P1 and P2. The first writer heater 604 is coupled between bond pad P1 and the ground pad 620. Because the reader heater 602 and the first writer heater 604 are both coupled to bond pad P1, bond pad P1 is considered a shared bond pad. Similarly, because the reader heater 602 and the second writer heater 606 are both coupled to bond pad P2, bond pad P2 is considered the shared bond pad. Inclusion of the diodes 608 and 610 in the circuitry shown in FIGS. 6A-6C facilitates the tri-modal operation and bond pad reduction achieved by this circuitry. The bond pad sharing configuration shown in FIGS. 6A-6C provides for a reduction of one bond pad over a conventional bond pad connection strategy.

FIG. 6A shows the circuit operating in a writer-1 mode. In the writer-1 mode, the first writer heater 604 (and a first writer of an IMR slider) is active, and the reader heater 602 and second writer heater 606 (and a second writer of the IMR slider) are inactive. This can be achieved by biasing bond pads P1 and P2 in the manner shown in FIG. 6A. More particularly, the voltage $V_1$ at bond pad P1 and the voltage $V_2$ at bond pad P2 are both negative and can be of equal magnitude. It is assumed that the potential, $V_g$, of the ground pad 620 is greater than the negative voltages $V_1$ and $V_2$ at bond pads P1 and P2. It is also assumed in the embodiments of FIGS. 6A-6C that the voltages $V_1$ and $V_2$ are chosen such that $|V_g|<|V_1|+V_0$ and $|V_g|<|V_2|+V_0$, which would eliminate the possibility of current flow in a direction opposite to that intended in each of these cases. The voltage $V_0$ is the built-in (threshold) voltage of the diode, such as diode 608 or 610 shown in FIGS. 6A-6C. Given the common mode biasing at bond pads P1 and P2, the first diode 608 is forward biased and the second diode 610 is reverse biased. As such, current flows through the first writer heater 604 and no current flows through the second writer heater 606. Because voltages $V_1$ and $V_2$ at bond pads P1 and P2 have the same polarity and preferably the same magnitude, no or negligible current flows through the reader heater 602 during the writer-1 mode.

FIG. 6B shows the circuit operating in a writer-2 mode. In the writer-2 mode, the second writer heater 606 (and the second writer of the IMR slider) is active, and the reader heater 602 and first writer heater 604 (and the first writer of the IMR slider) are inactive. This can be achieved by biasing bond pads P1 and P2 in the manner shown in FIG. 6B. More particularly, the voltage $V_1$ at bond pad P1 and the voltage $V_2$ at bond pad P2 are both positive and can be of equal magnitude. Given the common mode biasing at bond pads P1 and P2, the second diode 610 is forward biased and the first diode 608 is reverse biased. As such, current flows through the second writer heater 606 and no current flows through the first writer heater 604. Because voltages $V_1$ and $V_2$ at bond pads P1 and P2 have the same polarity and magnitude, no or negligible current flows through the reader heater 602 during the writer-2 mode.

FIG. 6C shows the circuit operating in a read mode. In the read mode, the reader heater 602 (and a reader of the IMR slider adjacent the reader heater 602) is active, and the first and second writer heaters 604 and 606 (and first and second writers) are inactive. This can be achieved by biasing bond pads P1 and P2 in the manner shown in FIG. 6C. More particularly, the voltage $V_1$ at bond pad P1 is positive and the voltage $V_2$ at bond pad P2 is negative. Given the differential mode biasing at bond pads P1 and P2, the first and second diodes 608 and 610 are reverse biased. As such, no current flows through the first and second writer heaters 604 and 606. Because of the potential difference across bond pads P1 and P2, current flows through the reader heater 602 during the read mode.

In some embodiments, the diodes 608 and 610 (and the diodes in other figures) can be formed by selecting materials and doping concentrations that increase diode threshold voltages, $V_0$, above any noise floor or ground fluctuations or to decrease threshold voltages to permit more of the voltage supply range to be utilized. Examples include changing the relative doping levels in semiconductor materials, changing the semiconducting material itself (e.g. germanium instead of silicon), and/or changing the selection of metals in contact with the semiconducting material (e.g. platinum instead of aluminum). Use of diodes with increased diode threshold voltages provides for enhanced ground noise immunity, which is of particular concern in bond pad sharing configurations involving slider components that can be adversely affected by ground noise, such as a reader or a contact sensor, for example.

One approach to preventing ground noise (assuming mean-zero ground potential) from reversing the direction of intended signal flow is to set the built-in potentials of the diodes (i.e., diode threshold voltages) such that $|\Delta V_g| < |V| + V_0$. Here, $\Delta V_g$ is the ground noise (fluctuation in the mean-zero ground potential), $V_0$ is the built-in diode potential, and V is the potential applied at the bond pad relative to the mean ground potential (assumed to be zero without loss of generality). The built-in diode potential, $V_0$, can be varied by choosing appropriate material combinations (e.g., p and n type materials for p-n diodes and metal-semiconductor combination for Schottky diodes).

As a specific example for p-n junction diodes, depending on the magnitude of the (empirically determined) ground noise, one could choose Ge (band-gap energy Eg=0.7 eV), Si (Eg=1.1 eV), GaAs (Eg=1.4 eV), etc. In addition, the doping levels can be manipulated to vary the concentration of acceptor atoms on the p-side and donor atoms on the n-side to vary the built-in potential (diode threshold voltage). Typical values of applied voltages required across the p-n junction for an appreciable current (e.g., 0.1 mA) is ~0.2 V for Ge, 0.6 V for Si, and 0.9 V for GaAs. Thus, if increased ground noise tolerance is desired or required, GaAs-based diodes can be used instead of Silicon-based diodes. On the other hand, if ground noise is known to be relatively small, it may be desirable to reduce $V_0$ by choosing Ge-based diodes. This way, the required potentials applied at the bond pads can be reduced or alternatively, this would allow for a greater range of the applied bond pad potential to be used for driving the devices.

Further manipulation of the threshold voltage, $V_0$, can be achieved through suitably tuning the doping levels. As an example, consider a p-n junction diode with $1^{16}$ acceptor atoms/cm$^3$ on the p-side and $1^{17}$ donor atoms/cm$^3$ on the n-side. The built-in potential (threshold voltage) of the diode is given by the relationship:

$$V_0 = (kT/e)\ln(N_a N_d/n_i^2),$$

where $n_i$ is the intrinsic concentration, $N_a$ is the concentration of acceptor atoms, and $N_d$ is the concentration of donor atoms. Then, at room temperature, we would have $V_0$=0.37 V for Ge ($n_i$=2.4$^{13}$/cm$^3$), $V_0$=0.76 V for Si ($n_i$=1.45$^{10}$/cm$^3$), and $V_0$=1.22 V for GaAs ($n_i$=1.79$^6$/cm$^3$). Thus, by varying the doping levels of acceptor and donor atoms as well as choosing the appropriate intrinsic semiconductor, the threshold voltage (built-in) voltage of the diode can be modified and tuned as required.

In the case of Schottky diodes, by choosing a suitable combination of metal and semiconductor, the contact potential at the interface, and therefore the built-in potential (diode threshold voltage) can be varied. For example, given a choice of semiconductor (e.g. SiC), the built-in voltage can be increased by ~1.1V by choosing polycrystalline Platinum instead of polycrystalline Tungsten, for example.

FIGS. 7A-7C illustrate circuits that support bond pad sharing between a multiplicity of heaters and at least one other component of a slider in accordance with various embodiments. More particularly, FIGS. 7A-7C illustrate circuits that support bond pad sharing between two heaters and a contact sensor of a slider in accordance with various embodiments. The bond pad sharing configuration shown in FIGS. 7A-7C provides for a reduction or elimination of two bond pads. In the embodiment shown in FIG. 7A-7C, the two heaters include a writer heater 704 and a reader heater 706. The contact sensor 702 is typically situated at the air bearing surface of the slider at or near a close point of the slider. The contact sensor 702 can be configured to sense for one or both of head-medium contact and thermal asperities. The contact sensor can be implemented as a thermal sensor, such as a resistive temperature sensor (e.g., TCR sensor), for example. As shown, the contact sensor is implemented as a DETCR (dual-ended TCR sensor). The contact sensor can be implemented using other technologies, such as a thermocouple or a thermistor.

The circuits shown in FIGS. 7A-7C are configured to facilitate tri-modal operation by activating and deactivating different components depending on operating mode. FIG. 7A shows the circuit configured to operate during a read mode. FIG. 7B shows the circuit configured to operate during a write mode. FIG. 7C shows the circuit configured to operate during a head-medium contact detection mode or a thermal asperity detection mode. As was discussed above, the contact sensor 702 can be configured to sense for head-medium contact, thermal asperities, or both head-medium contact and thermal asperities.

In the circuits shown in FIGS. 7A-7C, the contact sensor 702 is coupled between a first bond pad, P1, and a second bond pad, P2. A writer heater 704 is coupled between the first bond pad, P1 and a ground pad 720. A reader heater 706 is coupled between the second bond pad, P2 and the ground pad 720. The writer and reader heaters 704 and 706 can be implemented as metal wires or other resistive elements formed during slider fabrication. A first diode 708 and a first Zener diode 712 are coupled in series between the first bond pad, P1, and the ground pad 720, such as between bond pad P1 and the writer heater 704. As shown, the cathode of the diode 708 is coupled to bond pad P1, and the anode of the diode 708 is coupled to the anode of the Zener diode 712. The cathode of the Zener diode 712 is coupled to the writer heater 704, and the writer heater 704 is coupled to the ground pad 720. A second diode 710 and a second Zener diode 714 are coupled in series between the second bond pad, P2, and the ground pad 720, such as between bond pad P2 and the reader heater 706. As shown, the anode of the diode 710 is coupled to bond pad P2, and the cathode of the diode 710 is coupled to the cathode of the Zener diode 714. The anode of the Zener diode 714 is coupled to the reader heater 706, and the reader heater 706 is coupled to the ground pad 720. The first and second diodes 708 and 710 and the first and second Zener diodes 712 and 714 can be formed during slider fabrication using a silicon-on-slider methodology. In some embodiments, the first and second diodes 708 and 710 can be implemented as p-n diodes. In other embodiments, the first and second diodes 708 and 710 can be implemented as Schottky diodes (e.g., SiC Schottky diodes), either as part of the wafer process or using silicon-on-slider methodology.

According to some embodiments, the Zener diodes 712 and 714 are incorporated into the circuitry of FIGS. 7A-7C to enhance immunity to ground noise, and thereby maintain the desired control and directionality of signal flow across the devices (i.e. prevent flipping of a desired OFF state to an ON state due to ground noise). With the Zener diodes 712 and 714 incorporated into the circuitry as shown, proper operation can be achieved when the Zener reverse breakdown voltage>>maximum amplitude of ground noise. For example, the Zener diodes 712 and 714 can be implemented such that the following conditions are satisfied: $(V_+ - V_g)$>Zener breakdown voltage; $|(V_- - V_g)|$>Zener breakdown voltage; and the Zener breakdown voltage>>maximum amplitude of ground noise. It is noted that the Zener diodes can be eliminated from the circuits shown in FIGS. 7A-7C and other figures if the fluctuation in ground potential is $<|V_+|+V_0$ and $<|V_-|+V_0$. It is further noted that a transistor (e.g., bipolar junction transistor or field-effect transistor) can be used as a substitute for each diode/Zener diode pair shown in FIGS. 7A-7C and other figures. It is to be noted that V+ denotes a potential applied at a bond pad that is larger in magnitude than the mean ground potential, whereas V− denotes a potential applied at a bond pad that is smaller in magnitude than the mean ground potential.

FIG. 7A shows the circuit operating in a read mode. In the read mode, the reader heater 706 (along with a reader of the slider) is active, and the contact sensor 702 and the writer heater 704 are inactive. This can be achieved by biasing bond pads P1 and P2 in the manner shown in FIG. 7A. In particular, the voltage $V_1$ at bond pad P1 and the voltage $V_2$ at bond pad P2 are both positive and can be of equal magnitude. Given the common mode biasing at bond pads P1 and P2, the first diode 708 is reversed biased and the second diode 710 is forward biased. As such, current flows through the reader heater 706 and no current flows through the writer heater 704. Because voltages $V_1$ and $V_2$ at bond pads P1 and P2 have the same polarity and preferably the same magnitude, no or negligible current flows through the contact sensor 702 during the read mode. It is to be noted that for this case, $(V_2 - V_g)$ is set to be larger than the threshold voltage for the second diode 710 and greater than the breakdown voltage (reverse-bias) for the second Zener diode 714.

FIG. 7B shows the circuit operating in a write mode. In the write mode, the writer heater 704 (along with a writer of the slider which can be configured for IMR) is active, and the contact sensor 702 and the reader heater 706 are inactive. This can be achieved by biasing bond pads P1 and P2 in the manner shown in FIG. 7B. In particular, the voltage $V_1$ at bond pad P1 and the voltage $V_2$ at bond pad P2 are both negative and can be of equal magnitude. It is assumed that the potential, $V_g$, of the ground pad 720 is greater than the negative voltages $V_1$ and $V_2$ at bond pads P1 and P2. Given the common mode biasing at bond pads P1 and P2, the first diode 708 is forward biased and the second diode 710 is reversed biased. As such, current flows through the writer heater 704 and no current flows through the reader heater 706. Because voltages $V_1$ and $V_2$ at bond pads P1 and P2 have the same polarity and preferably the same magnitude, no or negligible current flows through the contact sensor 702 during the write mode. It is to be noted that for this case, $(V_g - V_1)$ is set to be larger than the threshold voltage for the first diode 708 and greater than the breakdown voltage (reverse-bias) for the first Zener diode 712.

FIG. 7C shows the circuit operating in a head-medium and/or asperity contact detection mode. In the contact detection mode, the contact sensor 702 is active, and the writer heater 704 and the reader heater 706 are inactive. This can be achieved by biasing bond pads P1 and P2 in the manner shown in FIG. 7C. More particularly, the voltage $V_1$ at bond pad P1 is positive and the voltage $V_2$ at bond pad P2 is negative. Given the differential mode biasing at bond pads P1 and P2, the first and second diodes 708 and 710 are reverse biased. As such, no current flows through the writer heater 704 and the reader heater 706. Because of the potential difference across bond pads P1 and P2, current flows through the contact sensor 702 during the contact detection mode. It is noted that the reverse-bias voltages across the diodes required for any appreciable current flow in the unintended signal flow directions would be much larger (e.g., >5-10 V) than $|V_2 - V_g|$ and $|V_1 - V_g|$ by suitable design of the diodes as well as suitable choice of $V_1$ and $V_2$. It is further noted that these embodiments are equally valid for substitutions of the contact detection sensor by other dual-ended devices such as a laser power monitor (e.g., a bolometer) for HAMR slider configurations.

For example, a bolometer can replace the contact sensor 702 shown in FIGS. 7A-7C (and other figures), and the circuits can function as previously described. A bolometer or other type of laser power monitor is a sensor configured to generate a signal in response to optical energy impinging on the sensor. In such embodiments, the bolometer 702 can be implemented as a small wire having a temperature coefficient of resistance and positioned proximate or in the vicinity of an optical component (e.g., NFT, waveguide) of a HAMR slider. The bolometer 702 can be configured to sense and monitor the output optical power of the laser diode used to energize the NFT via the waveguide of the slider. In some implementations, the signal generated by the bolometer 702 can be used to adjust the power supplied to the laser diode of a HAMR device.

Figure 8A:
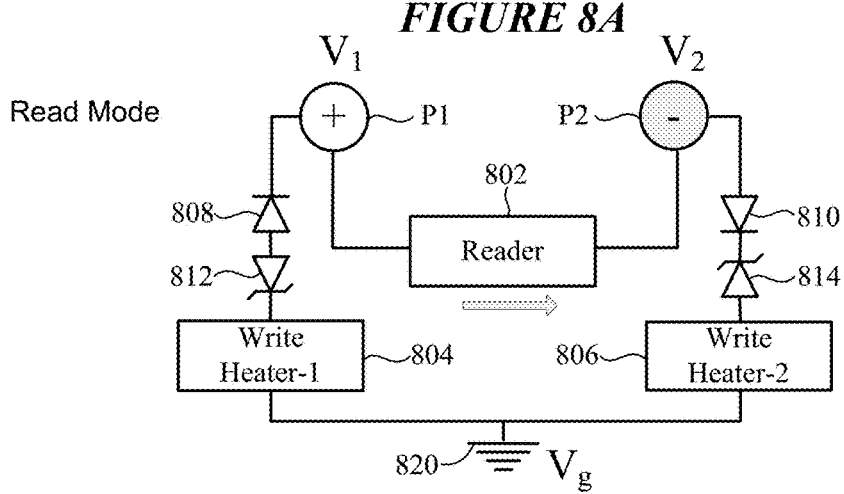
FIGS. 8A, 8B, and 8C illustrate circuits that support bond pad sharing between a multiplicity of heaters and at least one component of a slider in accordance with various embodiments.
Figure 8B:
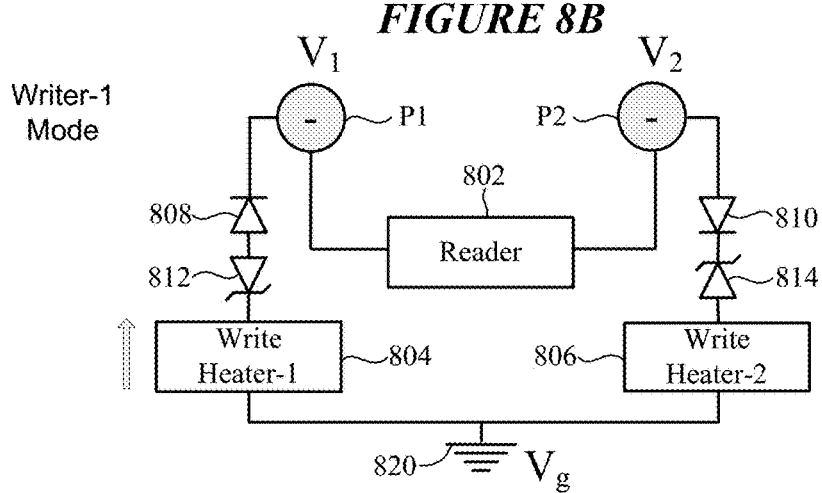
Figure 8C:
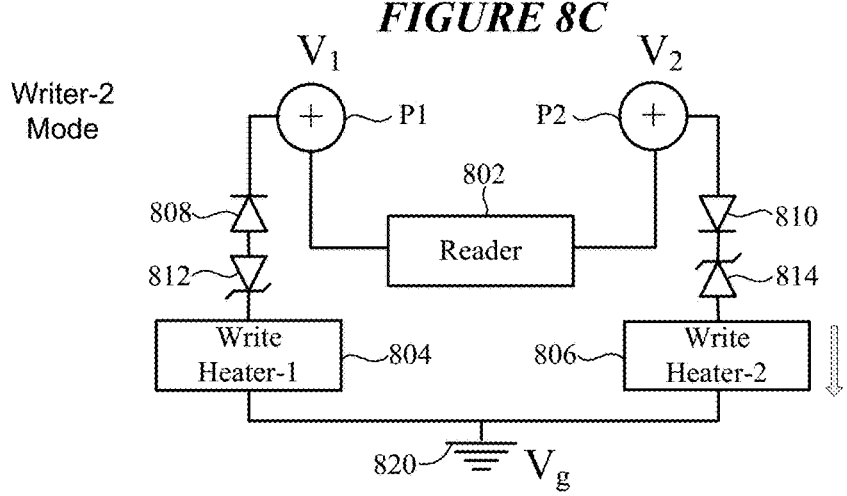

FIGS. 8A-8C illustrate circuits that support bond pad sharing between a multiplicity of heaters and at least one other component of a slider in accordance with various embodiments. More particularly, FIGS. 8A-8C illustrate circuits that support bond pad sharing between two heaters and a reader of a slider in accordance with various embodiments. The bond pad sharing configuration shown in FIGS. 8A-8C provides for a reduction or elimination of two bond pads. In the embodiment shown in FIG. 8A-8C, the two heaters include a first writer heater 804 and a second writer heater 806. In various embodiments, the first writer heater 804 is situated proximate a first writer of an IMR slider and configured to thermally actuate the first writer. The second writer heater 806 is situated proximate a second writer of the IMR slider and configured to thermally actuate the second writer. The reader 802 can be the sole reader of the slider or can be one of a multiplicity of readers (e.g. TDMR or MSMR recording heads).

The circuits shown in FIGS. 8A-8C are configured to facilitate tri-modal operation by activating and deactivating different components depending on operating mode. FIG. 8A shows the circuit configured to operate in a read mode, during which the reader 802 is active and the first and second writer heaters 804 and 806 are inactive. FIG. 8B shows the circuit configured to operate in a writer-1 mode, during which the first writer heater 804 is active and the reader 802 and second writer heater 806 are inactive. FIG. 8C shows the circuit configured to operate in a writer-2 mode, during which the second writer heater 806 is active and the reader 802 and first writer heater 804 are inactive.

In the circuits shown in FIGS. 8A-8C, the reader 802 is coupled between a first bond pad, P1, and a second bond pad, P2. A first writer heater 804 is coupled between the first bond pad, P1 and a ground pad 820. A second writer heater 806 is coupled between the second bond pad, P2 and the ground pad 820. The first and second writer heaters 804 and 806 can be implemented as metal wires or other resistive elements formed during slider fabrication. A first diode 808 and a first Zener diode 812 are coupled in series between the first bond pad, P1, and the ground pad 820, such as between bond pad P1 and the first writer heater 804. As shown, the cathode of the diode 808 is coupled to bond pad P1, and the anode of the diode 808 is coupled to the anode of the Zener diode 812. The cathode of the Zener diode 812 is coupled to the first writer heater 804, and the first writer heater 804 is coupled to the ground pad 820. A second diode 810 and a second Zener diode 814 are coupled in series between the second bond pad, P2, and the ground pad 820, such as between bond pad P2 and the second writer heater 806. As shown, the anode of the diode 810 is coupled to bond pad P2, and the cathode of the diode 810 is coupled to the cathode of the Zener diode 814. The anode of the Zener diode 814 is coupled to the second writer heater 806, and the second writer heater 806 is coupled to the ground pad 820. The first and second diodes 808 and 810 and the first and second Zener diodes 812 and 814 can be formed during slider fabrication using a silicon-on-slider methodology. In some embodiments, the first and second diodes 808 and 810 can be implemented as p-n diodes. In other embodiments, the first and second diodes 808 and 810 can be implemented as Schottky diodes (e.g., SiC Schottky diodes)), either as part of the wafer process or using silicon-on-slider methodology.

According to some embodiments, the Zener diodes 812 and 814 are incorporated into the circuitry of FIGS. 8A-8C to enhance immunity to ground noise, and thereby maintain the desired control and directionality of signal flow across the devices (i.e. prevent flipping of a desired OFF state to an ON state due to ground noise). With the Zener diodes 812 and 814 incorporated into the circuitry as shown, proper operation can be achieved when the Zener reverse breakdown voltage>>maximum amplitude of ground noise. For example, the Zener diodes 812 and 814 can be implemented such that the following conditions are satisfied: $(V_+ - V_g)$>Zener breakdown voltage; $|(V_- - V_g)|$>Zener breakdown voltage; and the Zener breakdown voltage>>maximum amplitude of ground noise. It is noted that the Zener diodes can be eliminated from the circuits shown in FIGS. 8A-8C if the fluctuation in ground potential is $<|V_+|+V_0$ and $<|V_-|+V_0$. It is further noted that a transistor (e.g., bipolar junction transistor or field-effect transistor) can be used as a substitute for each diode/Zener diode pair shown in FIGS. 8A-8C. It is noted that V+ denotes a potential applied at a bond pad that is larger in magnitude than the mean ground potential, whereas V− denotes a potential applied at a bond-pad that is smaller in magnitude than the mean ground potential.

FIG. 8A shows the circuit operating in a read mode. In the read mode, the reader 802 is active, and the first and writer heaters 804 and 806 (and first and second writers of an IMR slider) are inactive. This can be achieved by biasing bond pads P1 and P2 in the manner shown in FIG. 8A. More particularly, the voltage $V_1$ at bond pad P1 is positive and the voltage $V_2$ at bond pad P2 is negative. Given the differential mode biasing at bond pads P1 and P2, the first and second diodes 808 and 810 are reverse biased. As such, no current flows through the first and second writer heaters 804 and 806. Because of the potential difference across bond pads P1 and P2, current flows through the reader 802 during the read mode.

FIG. 8B shows the circuit operating in a writer-1 mode. In the writer-1 mode, the first writer heater 804 (and the first writer) is active, and the reader 802 and second writer heater 806 (and the second writer) are inactive. This can be achieved by biasing bond pads P1 and P2 in the manner shown in FIG. 8B. In particular, the voltage $V_1$ at bond pad P1 and the voltage $V_2$ at bond pad P2 are both negative and can be of equal magnitude. It is assumed that mean value of the potential, $V_g$, of the ground pad 820 is greater than the negative voltages $V_1$ and $V_2$ at bond pads P1 and P2. Given the common mode biasing at bond pads P1 and P2, the first diode 808 is forward biased and the second diode 810 is reverse biased. As such, current flows through the first writer heater 804 and no current flows through the second writer heater 806. Because voltages $V_1$ and $V_2$ at bond pads P1 and P2 have the same polarity and preferably the same magnitude, no or negligible current flows through the reader 802 during the writer-1 mode. In the scenario depicted in FIG. 8B, it is assumed that $|V_g-V_1|$>(reverse-bias) breakdown voltage of the Zener diode 812.

FIG. 8C shows the circuit operating in a writer-2 mode. In the writer-2 mode, the second writer heater 806 (and the second writer) is active, and the reader 802 and first writer heater 804 (and the first writer) are inactive. This can be achieved by biasing bond pads P1 and P2 in the manner shown in FIG. 8C. In particular, the voltage $V_1$ at bond pad P1 and the voltage $V_2$ at bond pad P2 are both positive and can be of equal magnitude. It is assumed that the potential, $V_g$, of the ground pad 820 is less than the positive voltages $V_1$ and $V_2$ at bond pads P1 and P2. Given the common mode biasing at bond pads P1 and P2, the second diode 810 is forward biased and the first diode 808 is reverse biased. In the scenario depicted in FIG. 8C, it is assumed that $(V_2-V_g)$>(reverse-bias) breakdown voltage of the Zener diode 814. As such, current flows through the second writer heater 806 and no current flows through the first writer heater 804. Because voltages $V_1$ and $V_2$ at bond pads P1 and P2 have the same polarity and magnitude, no or negligible current flows through the reader 802 during the writer-2 mode.

Figure 9A:
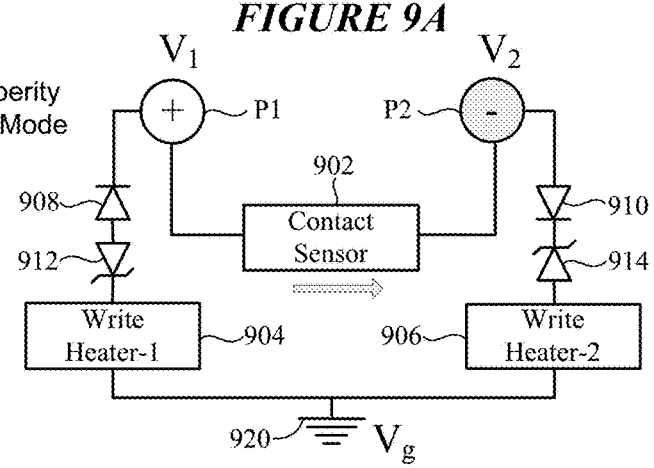
FIGS. 9A, 9B, and 9C illustrate circuits that support bond pad sharing between a multiplicity of heaters and at least one component of a slider in accordance with various embodiments.
Figure 9B:
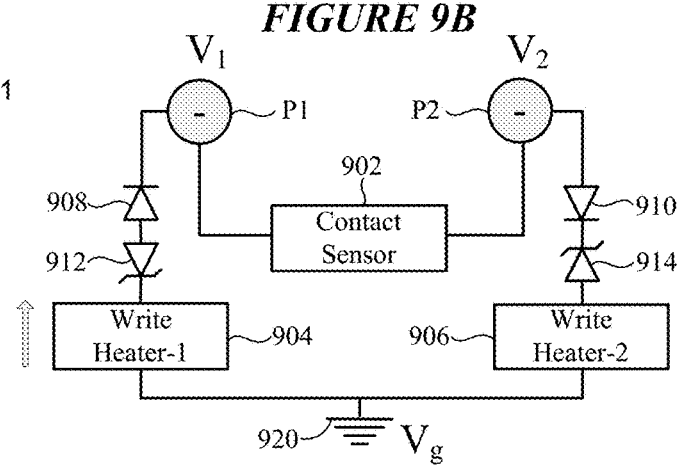
Figure 9C:
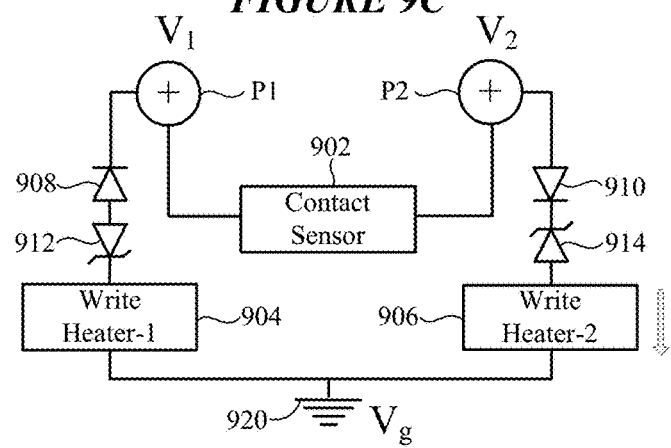

FIGS. 9A-9C illustrate circuits that support bond pad sharing between a multiplicity of heaters and at least one other component of a slider in accordance with various embodiments. More particularly, FIGS. 9A-9C illustrate circuits that support bond pad sharing between two heaters and a contact sensor of a slider in accordance with various embodiments. The bond pad sharing configuration shown in FIGS. 9A-9C provides for a reduction or elimination of two bond pads. In the embodiment shown in FIG. 9A-9C, the two heaters include a first writer heater 904 and a second writer heater 906. In various embodiments, the first writer heater 904 is situated proximate a first writer of an IMR slider and configured to thermally actuate the first writer. The second writer heater 906 is situated proximate a second writer of the IMR slider and configured to thermally actuate the second writer. The contact sensor 902 can be of a type previously described.

The circuits shown in FIGS. 9A-9C are configured to facilitate tri-modal operation by activating and deactivating different components depending on operating mode. FIG. 9A shows the circuit configured to operate in a contact detection mode, during which the contact sensor 902 is active and the first and second writer heaters 904 and 906 (and first and second writers of an IMR slider) are inactive. FIG. 9B shows the circuit configured to operate in a writer-1 mode, during which the first writer heater 904 (and the first writer) is active and the contact sensor 902 and second writer heater 906 (and the second writer) are inactive. FIG. 9C shows the circuit configured to operate in a writer-2 mode, during which the second writer heater 906 (and the second writer) is active and the contact sensor 902 and first writer heater 904 (and the first writer) are inactive.

In the circuits shown in FIGS. 9A-9C, the contact sensor 902 is coupled between a first bond pad, P1, and a second bond pad, P2. A first writer heater 904 is coupled between the first bond pad, P1 and a ground pad 920. A second writer heater 906 is coupled between the second bond pad, P2 and the ground pad 920. The first and second writer heaters 904 and 906 can be implemented as metal wires or other resistive elements formed during slider fabrication. A first diode 908 and a first Zener diode 912 are coupled in series between the first bond pad, P1, and the ground pad 920, such as between bond pad P1 and the first writer heater 904. As shown, the cathode of the diode 908 is coupled to bond pad P1, and the anode of the diode 908 is coupled to the anode of the Zener diode 912. The cathode of the Zener diode 912 is coupled to the first writer heater 904, and the first writer heater 904 is coupled to the ground pad 920. A second diode 910 and a second Zener diode 914 are coupled in series between the second bond pad, P2, and the ground pad 920, such as between bond pad P2 and the second writer heater 906. As shown, the anode of the diode 910 is coupled to bond pad P2, and the cathode of the diode 910 is coupled to the cathode of the Zener diode 914. The anode of the Zener diode 914 is coupled to the second writer heater 906, and the second writer heater 906 is coupled to the ground pad 920. The first and second diodes 908 and 910 and the first and second Zener diodes 912 and 914 can be formed during slider fabrication using a silicon-on-slider methodology. In some embodiments, the first and second diodes 908 and 910 can be implemented as p-n diodes. In other embodiments, the first and second diodes 908 and 910 can be implemented as Schottky diodes (e.g., SiC Schottky diodes)), either as part of the wafer process or using silicon-on-slider methodology.

According to some embodiments, the Zener diodes 912 and 914 are incorporated into the circuitry of FIGS. 9A-9C to enhance immunity to ground noise, and thereby maintain the desired control and directionality of signal flow across the devices (i.e. prevent flipping of a desired OFF state to an ON state due to ground noise). With the Zener diodes 912 and 914 incorporated into the circuitry as shown, proper operation can be achieved when the Zener reverse breakdown voltage>>maximum amplitude of ground noise. For example, the Zener diodes 912 and 914 can be implemented such that the following conditions are satisfied: $(V_+ -V_g)$>Zener breakdown voltage; $|(V_- -V_g)|$>Zener breakdown voltage; and the Zener breakdown voltage>>maximum amplitude of ground noise. It is noted that the Zener diodes can be eliminated from the circuits shown in FIGS. 9A-9C if the fluctuation in ground potential is $<|V_+|+V_0$ and $<|V_-|+V_0$. It is further noted that a transistor (e.g., bipolar junction transistor or field-effect transistor) can be used as a substitute for each diode/Zener diode pair shown in FIGS. 9A-9C. As was discussed previously, V+ denotes a potential applied at a bond-pad that is larger in magnitude than the mean ground potential, whereas V− denotes a potential applied at a bond-pad that is smaller in magnitude than the mean ground potential.

FIG. 9A shows the circuit operating in a contact detection mode. In the contact detection mode, the contact sensor 902 is active, and the first and writer heaters 904 and 906 are inactive. This can be achieved by biasing bond pads P1 and P2 in the manner shown in FIG. 9A. More particularly, the voltage $V_1$ at bond pad P1 is positive and the voltage $V_2$ at bond pad P2 is negative. Given the differential mode biasing at bond pads P1 and P2, the first and second diodes 908 and 910 are reverse biased. As such, no current flows through the first and second writer heaters 904 and 906. Because of the potential difference across bond pads P1 and P2, current flows through the contact sensor 902 during the contact detection mode. It is assumed that the potential, $V_g$, of the ground pad 920 is less than the positive voltage $(V_1)$ at bond-pad P1 and greater than the negative voltage $V_2$ at bond pad P2.

FIG. 9B shows the circuit operating in a writer-1 mode. In the writer-1 mode, the first writer heater 904 is active, and the contact sensor 902 and second writer heater 906 are inactive. This can be achieved by biasing bond pads P1 and P2 in the manner shown in FIG. 9B. In particular, the voltage $V_1$ at bond pad P1 and the voltage $V_2$ at bond pad P2 are both negative and can be of equal magnitude. It is assumed that the potential, $V_g$, of the ground pad 920 is greater than the negative voltages $V_1$ and $V_2$ at bond pads P1 and P2. In the scenario depicted in FIG. 9B, it is assumed that |Vg−V1|> (reverse-bias) breakdown voltage of the Zener diode 912. Given the common mode biasing at bond pads P1 and P2, the first diode 908 is forward biased and the second diode 910 is reverse biased. As such, current flows through the first writer heater 904 and no current flows through the second writer heater 906. Because voltages $V_1$ and $V_2$ at bond pads P1 and P2 have the same polarity and preferably the same magnitude, no or negligible current flows through the contact sensor 902 during the writer-1 mode.

FIG. 9C shows the circuit operating in a writer-2 mode. In the writer-2 mode, the second writer heater 906 is active, and the contact sensor 902 and first writer heater 904 are inactive. This can be achieved by biasing bond pads P1 and P2 in the manner shown in FIG. 9C. In particular, the voltage $V_1$ at bond pad P1 and the voltage $V_2$ at bond pad P2 are both positive and can be of equal magnitude. It is assumed that the potential, $V_g$, of the ground pad 920 is smaller than the positive voltages $V_1$ and $V_2$ at bond pads P1 and P2. In the scenario depicted in FIG. 9C, it is assumed that $|V2-Vg|>$ (reverse-bias) breakdown voltage of the Zener diode 914. Given the common mode biasing at bond pads P1 and P2, the second diode 910 is forward biased and the first diode 908 is reverse biased. As such, current flows through the second writer heater 906 and no current flows through the first writer heater 904. Because voltages $V_1$ and $V_2$ at bond pads P1 and P2 have the same polarity and magnitude, no or negligible current flows through the contact sensor 902 during the writer-2 mode.

FIGS. 10A and 10B illustrate circuits that support bond pad sharing between a multiplicity of components of a slider in accordance with various embodiments. FIGS. 10A and 10B illustrate a representative example of multiple bond pad sharing circuits that can be combined to provide a further reduction in bond-pad requirements. It will be understood that the combination of circuits shown in FIGS. 10A and 10B is provided for non-limiting illustrative purposes, and that other combinations of components are contemplated. In the representative example shown in FIGS. 10A and 10B, two circuits are shown, each of which provides for a reduction in bond-pad requirements.

The first circuit is coupled to bond pads P1 and P2, and includes a reader 1002, a first writer heater 1004, and a second writer heater 1006. The second circuit is coupled to bond pads P3 and P4, and includes a first contact sensor 1022 proximate a first writer of the slider (e.g., an IMR slider) and a reader heater 1026. FIG. 10A shows the circuitry in a read mode of operation, during which the reader 1002 and the reader heater 1026 are active, and the first writer heater 1004 (and the first writer), the second writer heater 1006 (and the second writer), and the first contact sensor 1022 are inactive. FIG. 10B shows the circuitry in a writer-1 mode, during which the first writer heater 1004 (and the first writer) and the first contact sensor 1022 are active, and the reader 1002, the second writer heater 1006 (and the second writer), and the reader heater 1026 are inactive.

In the first circuit shown in FIGS. 10A and 10B, the reader 1002 is coupled between a first bond pad, P1, and a second bond pad, P2. The first writer heater 1004 is coupled between the first bond pad, P1 and a ground pad 1020. The second writer heater 1006 is coupled between the second bond pad, P2 and the ground pad 1020. The first and second writer heaters 1004 and 1006 can be implemented as metal wires or other resistive elements formed during slider fabrication. A first diode 1008 and a first Zener diode 1012 are coupled in series between the first bond pad, P1, and the ground pad 1020, such as between bond pad P1 and the first writer heater 1004. As shown, the cathode of the diode 1008 is coupled to bond pad P1, and the anode of the diode 1008 is coupled to the anode of the Zener diode 1012. The cathode of the Zener diode 1012 is coupled to the first writer heater 1004, and the first writer heater 1004 is coupled to the ground pad 1020. A second diode 1010 and a second Zener diode 1014 are coupled in series between the second bond pad, P2, and the ground pad 1020, such as between bond pad P2 and the second writer heater 1006. As shown, the anode of the diode 1010 is coupled to bond pad P2, and the cathode of the diode 1010 is coupled to the cathode of the Zener diode 1014. The anode of the Zener diode 1014 is coupled to the second writer heater 1006, and the second writer heater 1006 is coupled to the ground pad 1020.

In the second circuit shown in FIGS. 10A and 10B, the first contact sensor 1022 is coupled between a third bond pad, P3, and a fourth bond pad, P4. The reader heater 1026 is coupled between the fourth bond pad, P4, and the ground pad 1020. A third diode 1030 and a third Zener diode 1034 are coupled in series between the fourth bond pad, P4, and the ground pad 1020, such as between bond pad P4 and the reader heater 1026. As shown, the anode of the diode 1030 is coupled to bond pad P4, and the cathode of the diode 1030 is coupled to the cathode of the Zener diode 1034. The anode of the Zener diode 1034 is coupled to the reader heater 1026, and the reader heater 1026 is coupled to the ground pad 1020. The first, second, and third diodes 1008, 1010, 1030 and the first, second, and third Zener diodes 1012, 1014, 1034 can be formed during slider fabrication using a silicon-on-slider methodology and be of a type previously described.

FIG. 10A shows the circuitry operating in a read mode. In the read mode, the reader 1002 and the reader heater 1026 are active, and the first writer heater 1004, the second writer heater 1006, and the first contact sensor 1022 are inactive. This can be achieved by biasing bond pads P1-P4 in the manner shown in FIG. 10A. More particularly, the voltage $V_1$ at bond pad P1 is positive, the voltage $V_2$ at bond pad P2 is negative, and the voltages $V_3$ and $V_4$ at bond pads P3 and P4 are positive. Given the differential mode biasing at bond pads P1 and P2, the first and second diodes 1008 and 1010 are reverse biased. As such, no current flows through the first and second writer heaters 1004 and 1006. Because of the potential difference across bond pads P1 and P2, current flows through the reader 1002 during the read mode. Given the common mode biasing at bond pads P3 and P4, the third diode 1030 is forward biased and current flows through the reader heater 1026, which thermally actuates the reader 1002.

FIG. 10B shows the circuitry operating in a writer-1 mode. In the writer-1 mode, the first writer heater 1004 and first contact sensor 1022 are active, and the reader 1002, the second writer heater 1006, and the reader heater 1026 are inactive. This can be achieved by biasing bond pads P1-P4 in the manner shown in FIG. 10B. In particular, the voltage $V_1$ at bond pad P1 and the voltage $V_2$ at bond pad P2 are both negative and can be of equal magnitude. The voltage $V_3$ at bond pad P3 is positive, and the voltage $V_4$ at bond pad P4 is negative. It is assumed that the potential, $V_g$, of the ground pad 1020 is greater than the negative voltages $V_1$ and $V_2$ at bond pads P1 and P2.

Given the common mode biasing at bond pads P1 and P2, the first diode 1008 is forward biased and the second diode 1010 is reverse biased. As such, current flows through the first writer heater 1004 and no current flows through the second writer heater 1006. Because voltages $V_1$ and $V_2$ at bond pads P1 and P2 have the same polarity and preferably the same magnitude, no or negligible current flows through the reader 1002 during the writer-1 mode. Given the negative potential at bond pad P4, the diode 1030 is reverse biased and no current flows through the reader heater 1026. Because the voltage $V_3$ is positive and the voltage $V_4$ is negative, current flows through the first contact sensor 1022 during the writer-1 mode. In cases where it is not desirable for the first contact sensor 1022 to be a live sensor, the voltages at bond pads P3 and P4 can be set to make the first writer heater 1004 active and the first contact sensor 1022 inactive. This can be achieved by providing negative and equal voltages ($V_3=V_4$) at both bond pads P3 and P4, and maintaining the negative voltages, $V_1$ and $V_2$, at bond pads P1 and P2 as shown in FIG. 10B.

Figure 11A:
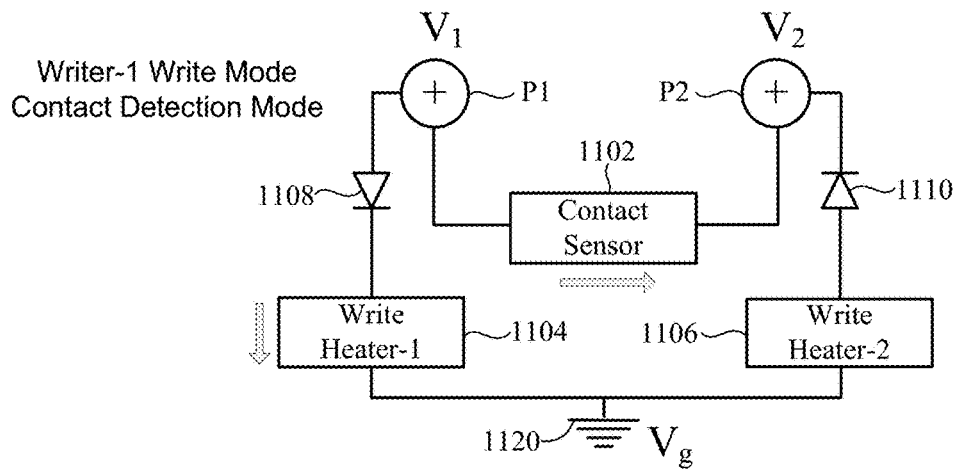
FIGS. 11A and 11B illustrate circuits that support bond pad sharing between a multiplicity of heaters and at least one component of a slider in accordance with various embodiments.
Figure 11B:
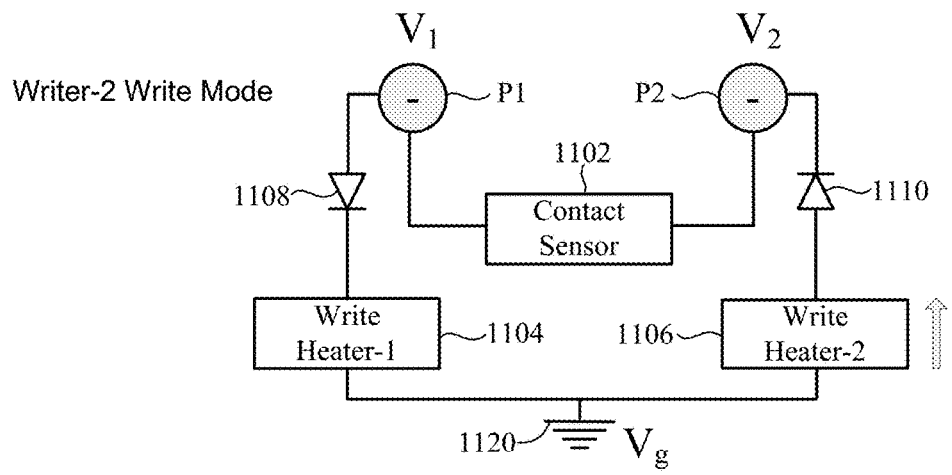

FIGS. 11A and 11B illustrate circuits that support bond pad sharing between a multiplicity of components of a slider in accordance with various embodiments. The embodiments of FIGS. 11A and 11B are similar to those shown in FIGS. 9A-9C, and illustrate bond pad sharing between a contact sensor 1102, a first writer heater 1104, and a second writer heater 1106. The embodiments of FIGS. 11A and 11B differ from those shown in FIGS. 9A-9C in that the contact sensor 1102 is active concurrently with a heater of the slider, such as the first writer heater 1104, during a write mode. For example, the contact sensor 1102 can be situated at or near a writer close point that is thermally actuated by the first writer heater 1104. The writer that this thermally actuated by the first writer heater 1104 can be a wide writer of an IMR slider. Although not shown, it is understood that Zener diodes can be incorporated into the circuitry shown in FIGS. 11A and 11B in a manner previously described to provide enhanced ground noise immunity, and thereby maintain the desired control and directionality of signal flow across the devices (i.e. prevent flipping of a desired OFF state to an ON state due to ground noise).

In the circuits shown in FIGS. 11A and 11B, the contact sensor 1102 is coupled between a first bond pad, P1, and a second bond pad, P2. A first writer heater 1104 is coupled between the first bond pad, P1 and a ground pad 1120. A second writer heater 1106 is coupled between the second bond pad, P2 and the ground pad 1120. A first diode 1108 is coupled between the first bond pad, P1, and the ground pad 1120, such as between bond pad P1 and the first writer heater 1104. As shown, the anode of the diode 1108 is coupled to bond pad P1, the cathode of the diode 1108 is coupled to the first writer heater 1104, and the first writer heater 1104 is coupled to the ground pad 1120. A second diode 1110 is coupled between the second bond pad, P2, and the ground pad 1120, such as between bond pad P2 and the second writer heater 1106. As shown, the cathode of the diode 1110 is coupled to bond pad P2, the anode of the diode 1110 is coupled to the second writer heater 1106, and the second writer heater 1106 is coupled to the ground pad 1120. The first and second diodes 1108 and 1110 can be of a type previously described.

FIG. 11A shows the circuit operating in a writer-1 mode, which is also a contact detection mode in this embodiment. In this mode, the first writer heater 1104 (and a first writer of an IMR slider) and the contact sensor 1102 are active, and the second writer heater 1106 (and a second writer of the IMR slider) is inactive. This can be achieved by biasing bond pads P1 and P2 in the manner shown in FIG. 11A. In particular, the voltage $V_1$ at bond pad P1 and the voltage $V_2$ at bond pad P2 are both positive, $V_1 > V_2$, and $V_2 > V_g$ (e.g., mean value of 0 V). Given the common mode biasing at bond pads P1 and P2, the first diode 1108 is forward biased and the second diode 1110 is reverse biased. Because $V_1 > V_2$, the contact sensor 1102 is energized. As such, current flows through the first writer heater 1104 and the contact sensor 1102, and no current flows through the second writer heater 1106 during the writer-1 mode.

FIG. 11B shows the circuit operating in a writer-2 mode. In this mode, the first writer heater 1104 (and the first writer) and the contact sensor 1102 are inactive, and the second writer heater 1106 (and the second writer) is active. This can be achieved by biasing bond pads P1 and P2 in the manner shown in FIG. 11B. In particular, the voltage $V_1$ at bond pad P1 and the voltage $V_2$ at bond pad P2 are both negative and of substantially the same magnitude. Given the common mode biasing at bond pads P1 and P2, the first diode 1108 is reversed biased and the second diode 1110 is forward biased. As such, current flows through the second writer heater 1106, and no current flows through the first writer heater 1104. Because voltages $V_1$ and $V_2$ at bond pads P1 and P2 have the same polarity and magnitude, no or negligible current flows through the contact sensor 1102 during the writer-2 mode.

Figure 12A:
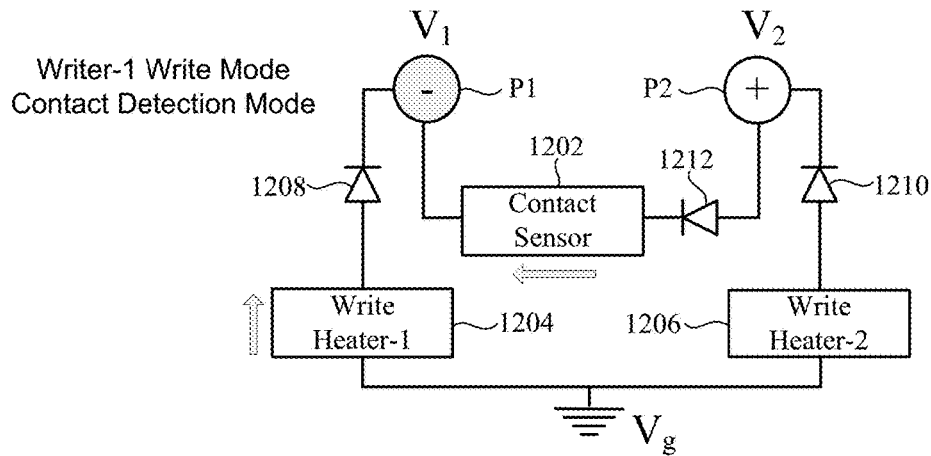
FIGS. 12A and 12B illustrate circuits that support bond pad sharing between a multiplicity of heaters and at least one component of a slider in accordance with various embodiments.
Figure 12B:
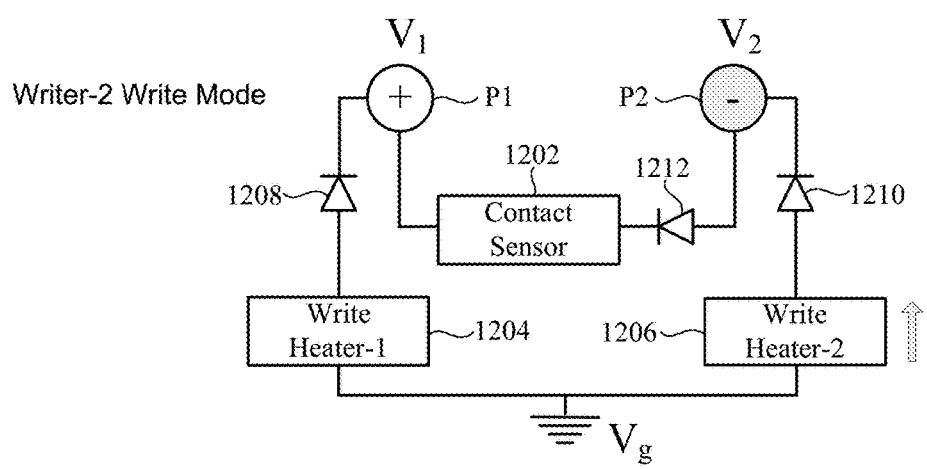

FIGS. 12A and 12B illustrate circuits that support bond pad sharing between a multiplicity of components of a slider in accordance with various embodiments. The embodiments of FIGS. 12A and 12B are similar to those shown in FIGS. 11A and 11B, and illustrate bond pad sharing between a contact sensor 1202, a first writer heater 1204, and a second writer heater 1206. The embodiments of FIGS. 12A and 12B differ from those shown in FIGS. 11A and 11B in that concurrent activation of the contact sensor 1202 and the first writer heater 1204 is achieved by differential biasing at bond pads P1 and P2. Although not shown, it is understood that Zener diodes can be incorporated into the circuitry shown in FIGS. 12A and 12B in a manner previously described to provide enhanced ground noise immunity, and thereby maintain the desired control and directionality of signal flow across the devices (i.e. prevent flipping of a desired OFF state to an ON state due to ground noise).

In the circuits shown in FIGS. 12A and 12B, the contact sensor 1202, the first writer heater 1204, and the second writer heater 1206 are coupled between the first and second bond pads, P1 and P2, as described in the discussion of FIGS. 11A and 11B. In FIGS. 12A and 12B, the cathode of the diode 1208 is coupled to bond pad P1, and the anode of the diode 1208 is coupled to the first writer heater 1204. The cathode of the diode 1210 is coupled to bond pad P2, and the anode of the diode 1210 is coupled to the second writer heater 1206. The first and second diodes 1208 and 1210 can be of a type previously described. A third diode 1212 is coupled between bond pads P1 and P2, such as between bond pad P2 and the contact sensor 1202. The anode of the diode 1212 is coupled to bond pad P2, and the cathode of the diode 1212 is coupled to the contact sensor 1202.

FIG. 12A shows the circuit operating in a writer-1 mode, which is also a contact detection mode in this embodiment. In this mode, the first writer heater 1204 (and a first writer of an IMR slider) and the contact sensor 1202 are active, and the second writer heater 1206 (and a second writer of the IMR slider) is inactive. This can be achieved by biasing bond pads P1 and P2 in the manner shown in FIG. 12A. In particular, the voltage $V_1$ at bond pad P1 is negative, and the voltage $V_2$ at bond pad P2 is positive. Given the differential mode biasing at bond pads P1 and P2 shown in FIG. 12A, the first diode 1208 is forward biased, the second diode 1210 is reverse biased, and the third diode 1212 is forward biased. Because $V_2 > V_1$, the third diode 1212 is forward biased and the contact sensor 1202 is energized. As such, current flows through the first writer heater 1204 and the contact sensor 1202, and no current flows through the second writer heater 1206 during the writer-1 mode.

FIG. 12B shows the circuit operating in a writer-2 mode. In this mode, the first writer heater 1204 (and the first writer) and the contact sensor 1202 are inactive, and the second writer heater 1206 (and the second writer) is active. This can be achieved by biasing bond pads P1 and P2 in the manner shown in FIG. 12B. In particular, the voltage $V_1$ at bond pad P1 is positive and the voltage $V_2$ at bond pad P2 is negative. Given the differential mode biasing at bond pads P1 and P2 shown in FIG. 12B, the first diode 1208 and the third diode 1212 are reversed biased and the second diode 1210 is forward biased. As such, current flows through the second writer heater 1206, and no current flows through the first writer heater 1204 and the contact sensor 1202.

Figure 13A:
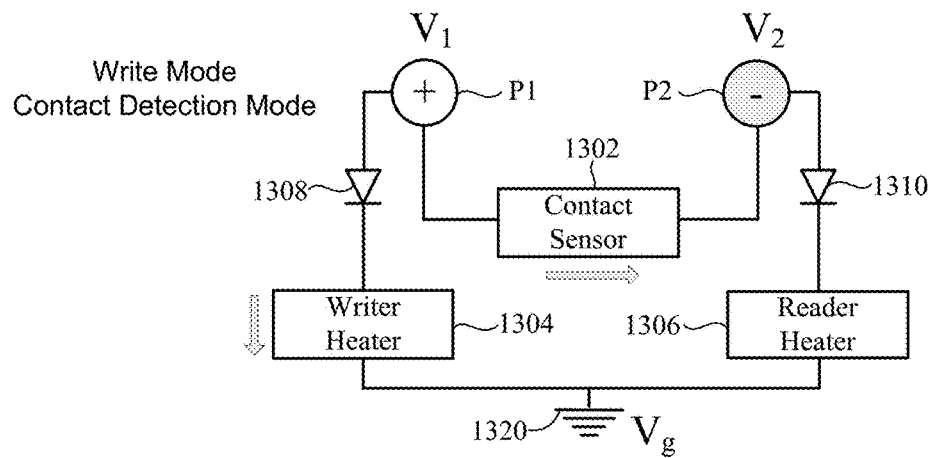
FIGS. 13A and 13B illustrate circuits that support bond pad sharing between a multiplicity of heaters and at least one component of a slider in accordance with various embodiments.
Figure 13B:
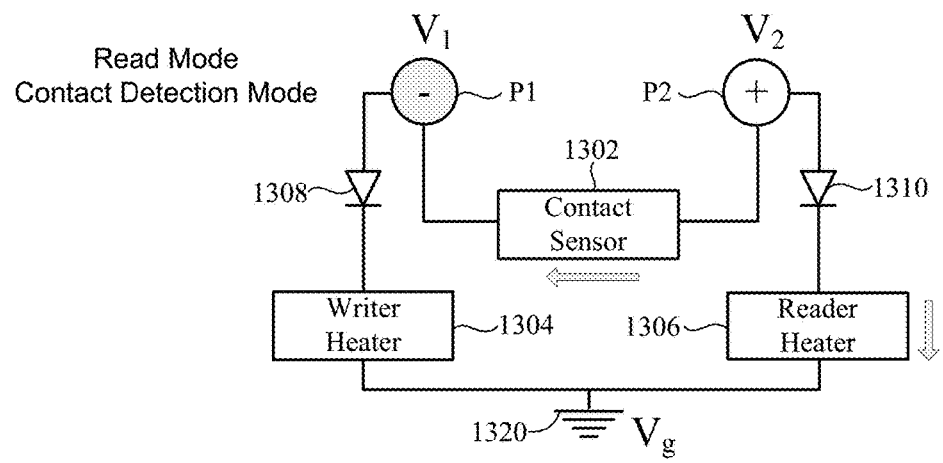

FIGS. 13A and 13B illustrate circuits that support bond pad sharing between a multiplicity of components of a slider in accordance with various embodiments. The embodiments of FIGS. 13A and 13B illustrate bond pad sharing between a contact sensor 1302, a writer heater 1304, and a reader heater 1306. In the embodiments of FIGS. 13A and 13B, the contact sensor 1302 is active concurrently with each active heater of the slider (which are alternately energized). The contact sensor 1302 can be situated at a location of the slider between the writer and reader heaters 1304 and 1306, for example. Although not shown, it is understood that Zener diodes can be incorporated into the circuitry shown in FIGS. 13A and 13B in a manner previously described to provide enhanced ground noise immunity, and thereby maintain the desired control and directionality of signal flow across the devices (i.e. prevent flipping of a desired OFF state to an ON state due to ground noise).

In the circuits shown in FIGS. 13A and 13B, the contact sensor 1302 is coupled between a first bond pad, P1, and a second bond pad, P2. The writer heater 1304 is coupled between the first bond pad, P1 and a ground pad 1320. The reader heater 1306 is coupled between the second bond pad, P2 and the ground pad 1320. A first diode 1308 is coupled between the first bond pad, P1, and the ground pad 1320, such as between bond pad P1 and the writer heater 1304. As shown, the anode of the diode 1308 is coupled to bond pad P1, the cathode of the diode 1308 is coupled to the writer heater 1304, and the writer heater 1304 is coupled to the ground pad 1320. A second diode 1310 is coupled between the second bond pad, P2, and the ground pad 1320, such as between bond pad P2 and the reader heater 1306. As shown, the anode of the diode 1310 is coupled to bond pad P2, the cathode of the diode 1310 is coupled to the reader heater 1306, and reader heater 1306 is coupled to the ground pad 1320. The first and second diodes 1308 and 1310 can be of a type previously described.

FIG. 13A shows the circuit operating in a write mode, which is also a contact detection mode in this embodiment. In this mode, the writer heater 1304 and the contact sensor 1302 are active, and the reader heater 1306 is inactive. This can be achieved by biasing bond pads P1 and P2 in the manner shown in FIG. 13A. In particular, the voltage $V_1$ at bond pad P1 is positive and the voltage $V_2$ at bond pad P2 is negative. Given the differential mode biasing at bond pads P1 and P2, the first diode 1308 is forward biased and the second diode 1310 is reverse biased. Because $V_1 > V_2$, the contact sensor 1302 is energized. As such, current flows through the writer heater 1304 and the contact sensor 1302, and no current flows through the reader heater 1306 during the write mode.

FIG. 13B shows the circuit operating in a read mode, which is also a contact detection mode in this embodiment. In this mode, the reader heater 1306 and the contact sensor 1302 are active, and the writer heater 1304 is active. This can be achieved by biasing bond pads P1 and P2 in the manner shown in FIG. 13B. In particular, the voltage $V_1$ at bond pad P1 is negative and the voltage $V_2$ at bond pad P2 is positive. Given the differential mode biasing at bond pads P1 and P2, the first diode 1308 is reversed biased and the second diode 1310 is forward biased. Because $V_2 > V_1$, the contact sensor 1302 is energized. As such, current flows through the reader heater 1304 and the contact sensor 1302, and no current flows through the writer heater 1304 during the read mode.

Figure 14A:
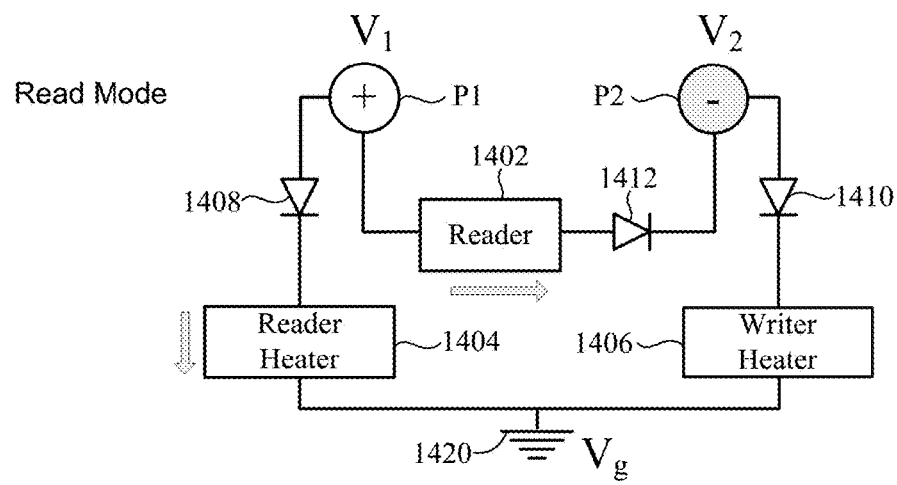
FIGS. 14A and 14B illustrate circuits that support bond pad sharing between a multiplicity of heaters and at least one component of a slider in accordance with various embodiments.
Figure 14B:
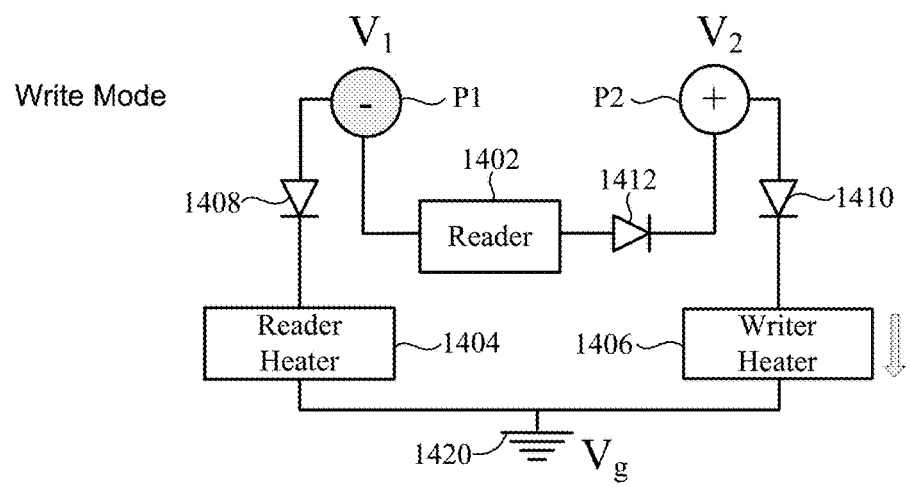

FIGS. 14A and 14B illustrate circuits that support bond pad sharing between a multiplicity of components of a slider in accordance with various embodiments. The embodiments of FIGS. 14A and 14B illustrate bond pad sharing between a reader 1402, a reader heater 1404, and a writer heater 1406. In the embodiments of FIGS. 14A and 14B, the reader 1402 is active concurrently with the reader heater 1404 during a read mode, during which the writer heater 1406 is inactive. In a write mode, the writer heater 1406 is active, and the reader 1402 and the reader heater 1404 are inactive. Although not shown, it is understood that Zener diodes can be incorporated into the circuitry shown in FIGS. 14A and 14B in a manner previously described to provide enhanced ground noise immunity, and thereby maintain the desired control and directionality of signal flow across the devices (i.e. prevent flipping of a desired OFF state to an ON state due to ground noise).

In the circuits shown in FIGS. 14A and 14B, the reader 1402 is coupled between a first bond pad, P1, and a second bond pad, P2. The reader heater 1404 is coupled between the first bond pad, P1 and a ground pad 1420. The writer heater 1406 is coupled between the second bond pad, P2 and the ground pad 1420. A first diode 1408 is coupled between the first bond pad, P1, and the ground pad 1420, such as between bond pad P1 and the reader heater 1404. As shown, the anode of the diode 1408 is coupled to bond pad P1, the cathode of the diode 1408 is coupled to the reader heater 1404, and the reader heater 1404 is coupled to the ground pad 1420. A second diode 1410 is coupled between the second bond pad, P2, and the ground pad 1420, such as between bond pad P2 and the writer heater 1406. As shown, the anode of the diode 1410 is coupled to bond pad P2, the cathode of the diode 1410 is coupled to the writer heater 1406, and writer heater 1406 is coupled to the ground pad 1420. A third diode 1412 is coupled between bond pads P1 and P2, such as between bond pad P2 and the reader 1402. The cathode of the diode 1412 is coupled to bond pad P2, and the anode of the diode 1412 is coupled to the reader 1402. The first, second, and third diodes 1408, 1410, and 1412 can be of a type previously described.

FIG. 14A shows the circuit operating in a read mode. In this mode, the reader 1402 and the reader heater 1404 are active, and the writer heater 1406 is inactive. This can be achieved by biasing bond pads P1 and P2 in the manner shown in FIG. 14A. In particular, the voltage $V_1$ at bond pad P1 is positive and the voltage $V_2$ at bond pad P2 is negative. Given the differential mode biasing at bond pads P1 and P2, the first diode 1408 and the third diode 1412 are forward biased and the second diode 1410 is reverse biased. As such, the reader 1402 is energized, current flows through the reader heater 1404, and no current flows through the writer heater 1406 during the read mode.

FIG. 14B shows the circuit operating in a write mode. In this mode, the writer heater 1406 is active, and the reader 1402 and the reader heater 1404 are inactive. This can be achieved by biasing bond pads P1 and P2 in the manner shown in FIG. 14B. In particular, the voltage $V_1$ at bond pad P1 is negative and the voltage $V_2$ at bond pad P2 is positive. Given the differential mode biasing at bond pads P1 and P2, the first diode 1408 and the third diode 1412 are reversed biased and the second diode 1410 is forward biased. As such, current flows through the writer heater 1404, the reader 1402 is de-energized, and no current flows through the reader heater 1404 during the write mode.

Figure 15A:
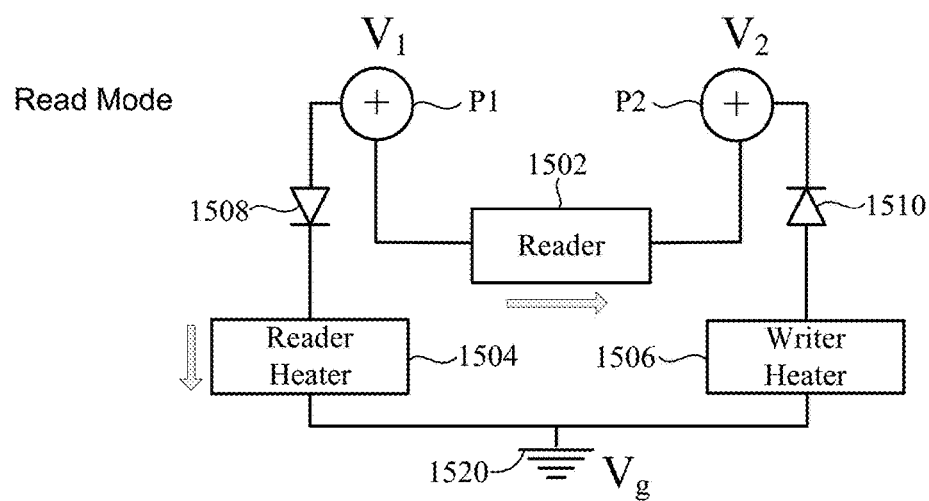
FIGS. 15A and 15B illustrate circuits that support bond pad sharing between a multiplicity of heaters and at least one component of a slider in accordance with various embodiments.
Figure 15B:
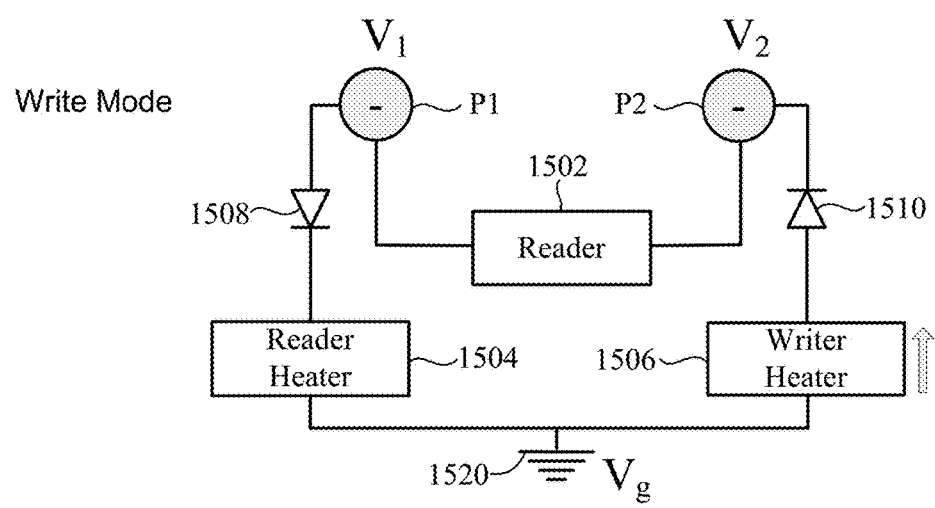

FIGS. 15A and 15B illustrate circuits that support bond pad sharing between a multiplicity of components of a slider in accordance with various embodiments. The embodiments of FIGS. 15A and 15B illustrate bond pad sharing between a reader 1502, a reader heater 1504, and a writer heater 1506. In the embodiments of FIGS. 15A and 15B, the reader 1502 is active concurrently with the reader heater 1504 during a read mode, during which the writer heater 1506 is inactive. In a write mode, the writer heater 1506 is active, and the reader 1502 and the reader heater 1504 are inactive. Although not shown, it is understood that Zener diodes can be incorporated into the circuitry shown in FIGS. 15A and 15B in a manner previously described to provide enhanced ground noise immunity, and thereby maintain the desired control and directionality of signal flow across the devices (i.e. prevent flipping of a desired OFF state to an ON state due to ground noise).

In the circuits shown in FIGS. 15A and 15B, the reader 1502 is coupled between a first bond pad, P1, and a second bond pad, P2. The reader heater 1504 is coupled between the first bond pad, P1 and a ground pad 1520. The writer heater 1506 is coupled between the second bond pad, P2 and the ground pad 1520. A first diode 1508 is coupled between the first bond pad, P1, and the ground pad 1520, such as between bond pad P1 and the reader heater 1504. As shown, the anode of the diode 1508 is coupled to bond pad P1, the cathode of the diode 1508 is coupled to the reader heater 1504, and the reader heater 1504 is coupled to the ground pad 1520. A second diode 1510 is coupled between the second bond pad, P2, and the ground pad 1520, such as between bond pad P2 and the writer heater 1506. As shown, the cathode of the diode 1510 is coupled to bond pad P2, the anode of the diode 1510 is coupled to the writer heater 1506, and writer heater 1506 is coupled to the ground pad 1520. The first and second diodes 1508 and 1510 can be of a type previously described.

FIG. 15A shows the circuit operating in a read mode. In this mode, the reader 1502 and the reader heater 1504 are active, and the writer heater 1506 is inactive. This can be achieved by biasing bond pads P1 and P2 in the manner shown in FIG. 15A. In particular, the voltages $V_1$ and $V_2$ at bond pads P1 and P2 are positive, and $V_1 > V_2$. Given this biasing at bond pads P1 and P2, the first diode 1508 is forward biased and the second diode 1510 is reverse biased. As such, the reader 1502 is energized, current flows through the reader heater 1504, and no current flows through the writer heater 1506 during the read mode.

FIG. 15B shows the circuit operating in a write mode. In this mode, the writer heater 1506 is active, and the reader 1502 and the reader heater 1504 are inactive. This can be achieved by biasing bond pads P1 and P2 in the manner shown in FIG. 15B. In particular, the voltages $V_1$ and $V_2$ at bond pads P1 and P2 are negative. Given the common mode biasing at bond pads P1 and P2, the first diode 1508 is reversed biased and the second diode 1510 is forward biased. As such, current flows through the writer heater 1504, the reader 1502 is de-energized, and no current flows through the reader heater 1504 during the write mode.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality.

Various modifications and additions can be made to the disclosed embodiments discussed above. Accordingly, the scope of the present disclosure should not be limited by the particular embodiments described above, but should be defined only by the claims set forth below and equivalents thereof.

What is claimed is:

1. An apparatus, comprising:
a slider of a magnetic recording head comprising a ground pad and a plurality of electrical bond pads coupled to bias sources;
a component of the slider coupled between first and second bond pads;
a first heater of the slider coupled between the first bond pad and the ground pad;
a second heater of the slider coupled between the second bond pad and the ground pad;
a first diode disposed on the slider and coupled in series with the first heater; and
a second diode disposed on the slider and coupled in series with the second heater.

2. The apparatus of claim 1, wherein the component comprises a reader heater.

3. The apparatus of claim 1, wherein the component comprises a reader.

4. The apparatus of claim 1, wherein the component comprises a contact sensor.

5. The apparatus of claim 1, wherein the component comprises a bolometer.

6. The apparatus of claim 1, wherein:
the slider further comprise a first writer and a second writer;
the first heater comprises a first writer heater situated proximate the first writer; and
the second heater comprises a second writer heater situated proximate the second writer.

7. The apparatus of claim 6, wherein the component comprises a reader heater.

8. The apparatus of claim 6, wherein the component comprises a reader.

9. The apparatus of claim 6, wherein the component comprises a contact sensor.

10. The apparatus of claim 1, wherein:
the first heater comprises a writer heater; and
the second heater comprises a reader heater.

11. The apparatus of claim 10, wherein the component comprises a contact sensor.

12. The apparatus of claim 1, further comprising:
a first Zener diode disposed on the slider and coupled between the first diode and the ground pad; and
a second Zener diode disposed on the slider and coupled between the second diode and the ground pad.

13. The apparatus of claim 1, wherein:
a threshold voltage of the first diode is established such that a fluctuation in a mean-zero ground potential at the ground pad is less than a sum of a voltage at the first bond pad and the threshold voltage of the first diode; and
a threshold voltage of the second diode is established such that a fluctuation in a mean-zero ground potential at the ground pad is less than a sum of a voltage at the second bond pad and the threshold voltage of the second diode.

14. The apparatus of claim 1, wherein the slider is configured for heat-assisted magnetic recording and further comprises an optical waveguide and a near-field transducer.

15. An apparatus, comprising:
a slider of a magnetic recording head comprising a ground pad, a plurality of electrical bond pads coupled to bias sources, a first writer having a wide write pole, and a second writer having a narrow write pole relative to that of the first writer;

a component of the slider coupled between first and second bond pads;

a first heater of the slider coupled between the first bond pad and the ground pad, the first heater situated proximate the first writer and configured to thermally actuate the first writer;

a second heater of the slider coupled between the second bond pad and the ground pad, the second heater situated proximate the second writer and configured to thermally actuate the second writer;

a first diode disposed on the slider and coupled in series with the first heater; and a second diode disposed on the slider and coupled in series with the second heater.

16. The apparatus of claim 15, further comprising:

a first Zener diode disposed on the slider and coupled between the first diode and the ground pad; and a second Zener diode disposed on the slider and coupled between the second diode and the ground pad.

17. The apparatus of claim 15, wherein the component comprises a reader heater or a reader.

18. The apparatus of claim 15, wherein the component comprises a contact sensor or a bolometer.

19. The apparatus of claim 15, wherein:

a threshold voltage of the first diode is established such that a fluctuation in a mean-zero ground potential at the ground pad is less than a sum of a voltage at the first bond pad and the threshold voltage of the first diode; and a threshold voltage of the second diode is established such that a fluctuation in a mean-zero ground potential at the ground pad is less than a sum of a voltage at the second bond pad and the threshold voltage of the second diode.

20. The apparatus of claim 15, wherein the slider is configured for heat-assisted magnetic recording and further comprises an optical waveguide and a near-field transducer.

21. An apparatus, comprising:

a slider of a magnetic recording head comprising a ground pad and a plurality of electrical bond pads coupled to bias sources;

a first component of the slider coupled between first and second bond pads;

a first heater of the slider coupled between the first bond pad and the ground pad;

a second heater of the slider coupled between the second bond pad and the ground pad;

a first diode disposed on the slider and coupled in series with the first heater;

a second diode disposed on the slider and coupled in series with the second heater;

a second component of the slider coupled between third and fourth bond pads;

a third heater of the slider coupled between the fourth bond pad and the ground pad; and a third diode disposed on the slider and coupled in series with the third heater.

22. The apparatus of claim 21, further comprising:

a first Zener diode disposed on the slider and coupled between the first diode and the ground pad;

a second Zener diode disposed on the slider and coupled between the second diode and the ground pad; and a third Zener diode disposed on the slider and coupled between the third diode and the ground pad.

23. The apparatus of claim 21, wherein:

a threshold voltage of the first diode is established such that a fluctuation in a mean-zero ground potential at the ground pad is less than a sum of a voltage at the first bond pad and the threshold voltage of the first diode;

a threshold voltage of the second diode is established such that a fluctuation in a mean-zero ground potential at the ground pad is less than a sum of a voltage at the second bond pad and the threshold voltage of the second diode; and a threshold voltage of the third diode is established such that a fluctuation in a mean-zero ground potential at the ground pad is less than a sum of a voltage at the fourth bond pad and the threshold voltage of the third diode.

* * * * *